US011862003B2

(12) United States Patent
Poder et al.

(10) Patent No.: US 11,862,003 B2
(45) Date of Patent: *Jan. 2, 2024

(54) MANAGING SENSORS AND COMPUTING DEVICES ASSOCIATED WITH A PREMISES

(71) Applicant: Comcast Cable Communications, LLC, Philadelphia, PA (US)

(72) Inventors: James Poder, Carlsbad, CA (US); Galen Trevor Gattis, Sunnyvale, CA (US); Chris Kennedy, Highlands Ranch, CO (US); Karen Serviss, Aurora, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,165

(22) Filed: Dec. 16, 2022

(65) Prior Publication Data

US 2023/0121273 A1    Apr. 20, 2023

Related U.S. Application Data

(63) Continuation of application No. 17/443,006, filed on Jul. 19, 2021, now Pat. No. 11,557,192, which is a continuation of application No. 16/237,003, filed on Dec. 31, 2018, now Pat. No. 11,069,222, which is a continuation of application No. 15/629,309, filed on Jun. 21, 2017, now Pat. No. 10,217,348, which is a continuation of application No. 14/985,671, filed on Dec. 31, 2015, now Pat. No. 9,715,818, which is a continuation of application No. 13/804,274, filed on Mar. 14, 2013, now Pat. No. 9,262,906.

(51) Int. Cl.
*G08B 25/00* (2006.01)
*H04W 4/00* (2018.01)
*G06F 1/00* (2006.01)

(52) U.S. Cl.
CPC ......... *G08B 25/001* (2013.01); *G08B 25/003* (2013.01); *G06F 1/00* (2013.01); *H04W 4/00* (2013.01)

(58) Field of Classification Search
CPC .................................................. G08B 25/001
See application file for complete search history.

(56) References Cited

U.S. PATENT DOCUMENTS

| 3,809,263 | A | 5/1974 | Dodd et al. |
| 6,909,921 | B1* | 6/2005 | Bilger ................ G08B 21/0492 700/63 |
| 9,552,478 | B2 | 1/2017 | Sobko et al. |
| 2003/0233313 | A1 | 12/2003 | Bartolucci |
| 2010/0117579 | A1 | 5/2010 | Culbert et al. |
| 2011/0140849 | A1 | 6/2011 | Matus et al. |

(Continued)

*Primary Examiner* — Travis R Hunnings
(74) *Attorney, Agent, or Firm* — Banner & Witcoff, Ltd.

(57) ABSTRACT

Methods, systems, computer-readable media, and apparatuses for managing sensors and computing devices associated with a premises are presented. An example method comprises receiving, by a computing device from a mobile device: an image of a sensor that comprises a quick response (QR) code; and a request to add the sensor to an account associated with a premises; identifying the sensor based on the QR code; and based on identifying the sensor based on the QR code, adding the sensor to a list of sensors associated with the account.

60 Claims, 12 Drawing Sheets

(56) References Cited

U.S. PATENT DOCUMENTS

| | | |
|---|---|---|
| 2012/0108917 A1 | 5/2012 | Libbus et al. |
| 2013/0151088 A1 | 6/2013 | Ricci |
| 2013/0226316 A1 | 8/2013 | Duchene et al. |
| 2013/0262788 A1 | 10/2013 | Zhang et al. |
| 2014/0184613 A1 | 7/2014 | Exterman et al. |
| 2014/0222223 A1 | 8/2014 | Horton et al. |
| 2014/0266684 A1* | 9/2014 | Poder .................. G08B 25/001 340/521 |
| 2015/0364027 A1* | 12/2015 | Haupt .................... G08B 25/08 340/521 |

* cited by examiner

MANAGING SENSORS AND COMPUTING DEVICES ASSOCIATED WITH A PREMISES

CROSS-REFERENCE TO RELATED APPLICATIONS

This application is a continuation of U.S. application Ser. No. 17/443,006 filed Jul. 19, 2021 (now U.S. Pat. No. 11,069,222), which is a continuation of U.S. application Ser. No. 16/237,003 filed Dec. 31, 2018 (now U.S. Pat. No. 11,069,222), which is a continuation of U.S. application Ser. No. 15/629,309, filed Jun. 21, 2017 (now U.S. Pat. No. 10,217,348), which is a continuation of U.S. application Ser. No. 14/985,671, filed Dec. 31, 2015 (now U.S. Pat. No. 9,715,818), which is a continuation of U.S. application Ser. No. 13/804,274, filed Mar. 14, 2013 (now U.S. Pat. No. 9,262,906), all of which are hereby incorporated by reference in their entireties.

BACKGROUND

Aspects of the disclosure relate to methods and systems that may be used with or implemented in automation and security systems, such as home automation and/or home security systems. In particular, various aspects of the disclosure relate to methods and systems for processing sensor data.

Increasingly, network gateway devices, which may be deployed at various premises in order to provide connectivity to various networks, are providing more and more types of functionalities. For example, in addition to receiving and/or decoding multimedia content, such as television programming, network gateway devices also may provide internet connectivity and wireless local area networking (WLAN) functionalities, as well as home automation and home security functionalities.

In some instances, such a gateway device might include and incorporate a home security server, which may enable the gateway device to provide home automation and/or home security services at a particular premises. This might include monitoring various sensors (including security sensors and other types of sensors), controlling various lighting systems and heating, ventilation, and air conditioning (HVAC) systems, and performing other functions.

As these gateway devices perform an increasingly large number of functions, however, the processing resources of each individual gateway may be in greater demand. In some instances, because a particular gateway device may have limited processing resources, it might not be possible for the gateway device to reliably provide all of the functionalities and services that it might otherwise be capable of delivering with increased resources.

BRIEF SUMMARY

Some aspects of the disclosure provide ways of more efficiently using the processing resources of a gateway device by prioritizing certain functions, particularly certain sensor monitoring functions, over others, which may enable the device to provide more convenient and reliable service and functionality to its users.

In particular, certain embodiments are directed to techniques in which, prior to processing received sensor data, some functions, along with their associated sensor data, are classified as critical, while other functions, along with their associated sensor data, are classified as non-critical. The non-critical functions and processing of the non-critical sensor data can then be delegated to a network server, while the critical functions and processing of the critical sensor data can be performed locally at the gateway device.

In some instances, these techniques may be implemented in situations in which a network gateway device provides both home security functions, which might be considered critical, and home automation and lawn watering functions, which might be considered non-critical.

For example, in one or more embodiments, a home security server may receive sensor data from one or more sensors that are located at a premises. Subsequently, the home security server may classify a first portion of the received sensor data as critical sensor data, based on the first portion of the received sensor data being associated with a critical function. In addition, the home security server may classify a second portion of the received sensor data as non-critical sensor data, based on the second portion of the received sensor data being associated with a non-critical function. Thereafter, the home security server may process the critical sensor data, and further may provide the non-critical sensor data to a network server for processing.

In some embodiments, classifying the first portion of the received sensor data may be based on one sensor profile for a critical sensor of the one or more sensors, and classifying the second portion of the received sensor data may be based on another sensor profile for a non-critical sensor of the one or more sensors. These sensor profiles may, for instance, include settings specified by a user of the home security server.

In some embodiments, the home security server may receive sensor registration information for a new sensor, which, for instance, has been recently installed by the user and is now located at the premises. The sensor registration information may, for example, include location information that indicates the position at which the new sensor has been installed. In some instances, the sensor registration information may include an image of the new sensor, and the home security server may select a sensor profile (e.g., from a library of predefined sensor profiles) for the new sensor based on the image.

In some embodiments, the home security server also may determine whether a connection to the network server is available, prior to providing the non-critical sensor data to the network server for processing. If, for instance, the connection to the network server is not available, then the home security server may process the non-critical sensor data locally (e.g., after it processes the critical sensor data).

These features, along with many others, are discussed in greater detail below.

BRIEF DESCRIPTION OF THE DRAWINGS

Aspects of the disclosure are illustrated by way of example with respect to the accompanying figures, in which like reference numerals indicate similar elements, and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As introduced above, various aspects of the disclosure relate to processing sensor data, particularly in situations where different types of sensor data are being collected from a number of different sensors at a premises. In several of the examples that are discussed below, the ways in which sensor data may be classified and processed in various embodiments will be illustrated. Before turning to these examples, however, an example of an information distribution network which includes one or more of the computing devices discussed below, and which can be used in sending and receiving various messages and/or other data, will first be described. In addition, an example of a computing device and various hardware components that can be used in implementing one or more of the computing devices discussed herein will also be described.

Figure 1:
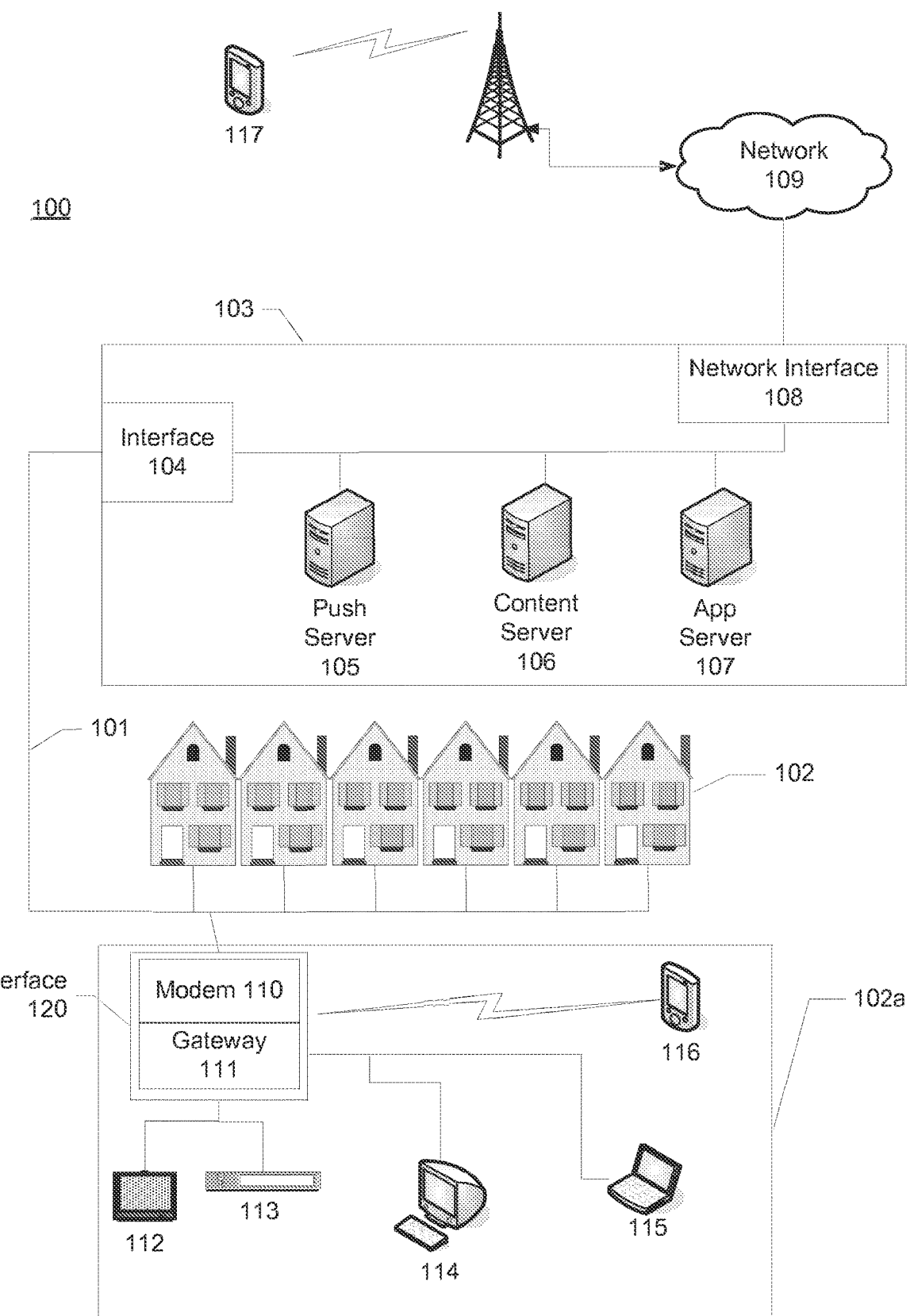
FIG. 1 illustrates an example system in which various features discussed herein may be implemented.

FIG. 1 illustrates an example information distribution network 100 on which many of the various features described herein may be implemented. Network 100 may be any type of information distribution network, such as a satellite network, a telephone network, a cellular network, a wireless network, and/or combinations thereof. For example, network 100 may be an optical fiber network, a coaxial cable network, or a hybrid fiber/coax (HFC) distribution network. Such a network 100 can use a series of interconnected communication links 101 (e.g., coaxial cables, optical fibers, wireless connections, etc.) to connect multiple premises 102 (e.g., businesses, homes, consumer dwellings, etc.) to a local office 103 (e.g., a headend, a central office, a processing facility, etc.). The local office 103 may transmit downstream information signals onto the links 101, and each premises 102 may have a receiver that can be used to receive and process those signals. The geographic location of the local office 103 can vary, and the local office 103 may be proximate to a user's neighborhood in some embodiments, while in other embodiments, the local office 103 may be located remotely at a centralized location. The various servers can be located anywhere, and their location might not be relevant to a user (e.g., the servers may be in the "cloud").

In some arrangements, there may be one link 101 originating from the local office 103, and it may be split a number of times to distribute the signal to various premises 102 in the vicinity (which may be many miles) of the local office 103. The links 101 may include components that are not illustrated, such as splitters, filters, amplifiers, etc., to help convey the signal clearly. Some portions of the links 101 also may be implemented with fiber-optic cable, while other portions may be implemented with coaxial cable, other lines, or wireless communication paths.

The local office 103 may include an interface 104, such as a termination system (TS) or a cable modem termination system (CMTS) in an example of an HFC-type network, which may be a computing device that is configured to manage communications between devices on the network of links 101 and backend devices, such as servers 105, 106, and 107 (which are discussed further below). In the example of an HFC-type network, the TS may be as specified in a standard, such as the Data Over Cable Service Interface Specification (DOCSIS), published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks, Internet devices, telephone networks, cellular telephone networks, fiber optic networks, local wireless networks (e.g., LTE, WiMAX, etc.), satellite networks, and any other desired network, and the interface 108 may include the corresponding circuitry needed to communicate on the network 109, and to communicate with other devices on the network, such as a cellular telephone network and its corresponding cell phones (e.g., cellular phone 117). Collectively, these networks 109 may be referred to herein as "the cloud" or "cloud architecture."

As noted above, the local office 103 may include a variety of servers that may be configured to perform various functions. For example, the local office 103 may include a back office server 105. The back office server 105 may generate push notifications related to functions, such as billing, reporting, and subscriber management to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users, who may be, for example, in the premises 102 (e.g., homes). In some embodiments, the content server 106 may include software to validate (or initiate the validation of) user identities and entitlements, locate and retrieve (or initiate the location and retrieval of) requested content, encrypt the content, and initiate delivery (e.g., streaming, transmitting via a series of content fragments) of the content to the requesting user and/or device. Other server computing devices may be present as well, such as one or more application servers 107, which are discussed below. Also, the various servers and elements are depicted in a local office 103, but they need not be co-located in a common premises, and instead may have some or all elements located remotely in the network 109.

The local office 103 may further include one or more application servers 107 and/or may communicate with one or more application servers 107 that may be maintained in the cloud 109. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX, and COMET). For example, an application server 107 may be responsible for collecting television program listings information and generating a data download for electronic program guide listings. Another application server 107 may be responsible for monitoring user viewing habits and collecting that information for use in selecting advertisements. Another application server may be responsible for formatting and inserting advertisements in a video stream and/or content item being transmitted to the premises 102. As discussed below, still another application server 107 may be used to monitor and/or otherwise communicate with one or more security servers, security consoles, and/or security systems that may be deployed at various locations, such as the premises 102. Such an application server 107 may, for instance, be configured to receive and process non-critical sensor data from the various premises 102, in accordance with various aspects discussed in greater detail below.

An example premises 102a may include an interface 120, which may include a modem 110 (or another receiver and/or transmitter device suitable for a particular network), which may include transmitters and receivers used to communicate on the links 101 and with the local office 103. The modem 110 may be, for example, a coaxial cable modem (for coaxial cable lines 101), a fiber interface node (for fiber optic links 101), or any other desired modem device. The modem 110 may be connected to, or be a part of, a gateway interface device 111. The gateway interface device 111 may be a computing device that communicates with the modem 110 to allow one or more other devices in the premises 102a to communicate with the local office 103 and other devices beyond the local office. The gateway 111 may be a set-top box (STB), digital video recorder (DVR), computer server, or any other desired computing device. The gateway 111 may also include local network interfaces (not shown) that can provide communication signals to other devices in the premises 102a (e.g., user devices), such as televisions 112, additional STBs 113, personal computers 114, laptop computers 115, wireless devices 116 (e.g., wireless laptops and networks, mobile phones, mobile televisions, tablet computers, PDAs, etc.), and any other desired devices. Examples of the local network interfaces may include Multimedia over Coax Alliance (MoCA) interfaces, Ethernet interfaces, universal serial bus (USB) interfaces, wireless interfaces (e.g., IEEE 802.11), 4G, WiMAX, LTE, Bluetooth interfaces, and others. In some embodiments, the system may use ZigBee and Z-Wave compliant devices.

Figure 2:
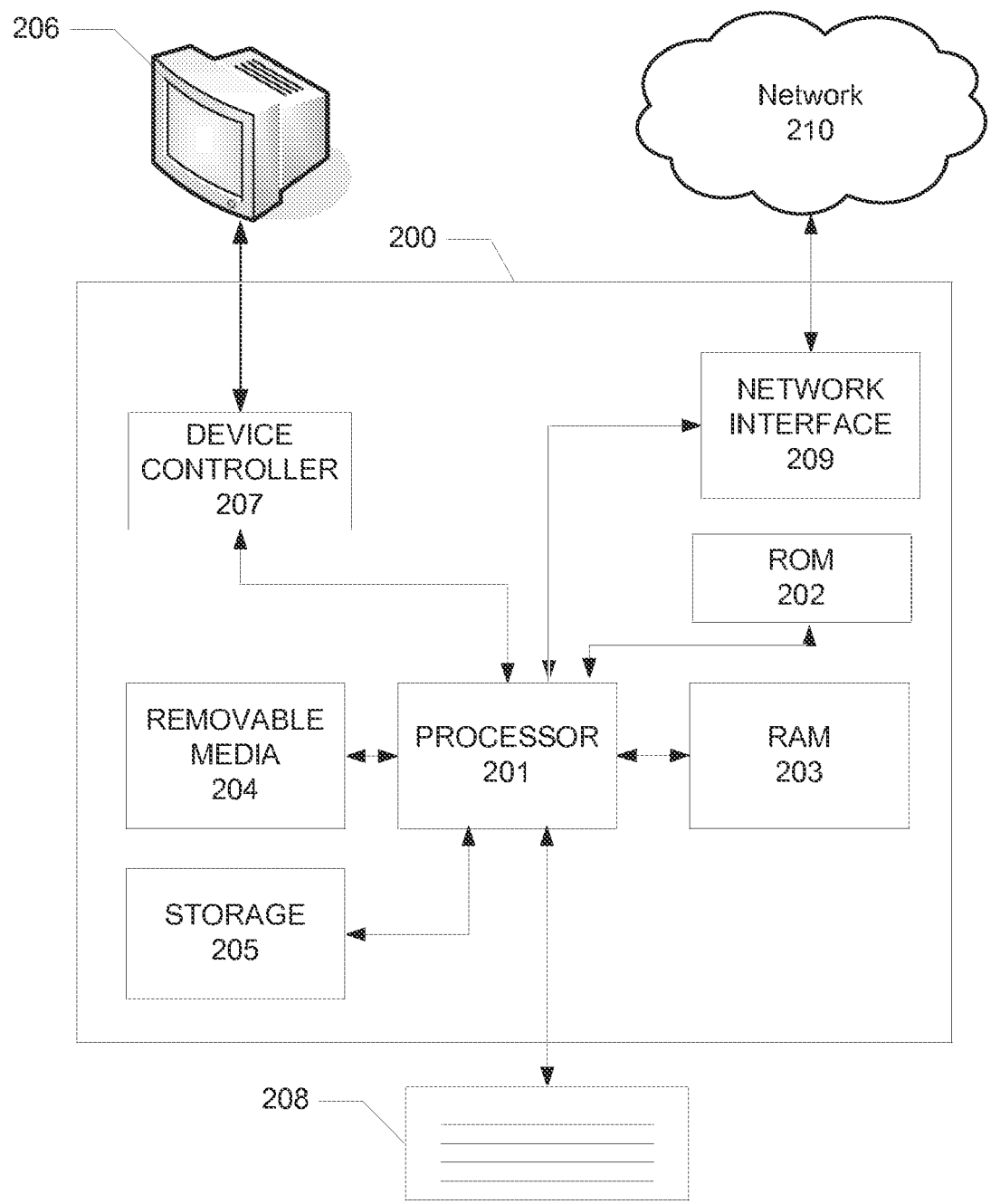
FIG. 2 illustrates an example computing device that may be used to implement any of the computing devices and servers discussed herein.

FIG. 2 illustrates general hardware elements that can be used to implement any of the various computing devices discussed herein. The computing device 200 may include one or more processors 201, which may execute instructions of a computer program to perform any of the features discussed herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The computing device 200 may also include one or more network interfaces 209, such as input/output circuits (such as a network card) to communicate with an external network 210. The network interface 209 may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

FIG. 2 shows an example hardware configuration. Modifications may be made to add, remove, combine, and/or divide, etc., components as desired. Additionally, the components illustrated may be implemented using basic computing devices and components, and the same components (e.g., processor 201, ROM 202, user input devices 208, etc.) may be used to implement any of the other computing devices and components described herein. For example, the various components herein may be implemented using computing devices having components such as a processor executing computer-executable instructions stored on a computer-readable medium (e.g., storage 205), as illustrated in FIG. 2.

One or more aspects of the disclosure may be embodied in computer-usable data and/or computer-executable instructions, such as in one or more program modules, executed by one or more computers or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media, such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents, such as integrated circuits, field programmable gate arrays (FPGAs), and the like. Particular data structures may be used to more effectively implement one or more aspects of the disclosure, and such data structures are contemplated as being within the scope of computer executable instructions and computer-usable data described herein.

Having described an example of an information distribution network and an example of a computing device that may be used in implementing various aspects of the disclosure, several examples illustrating how sensor data may be classified and processed in some embodiments will now be described in greater detail.

Figure 3:
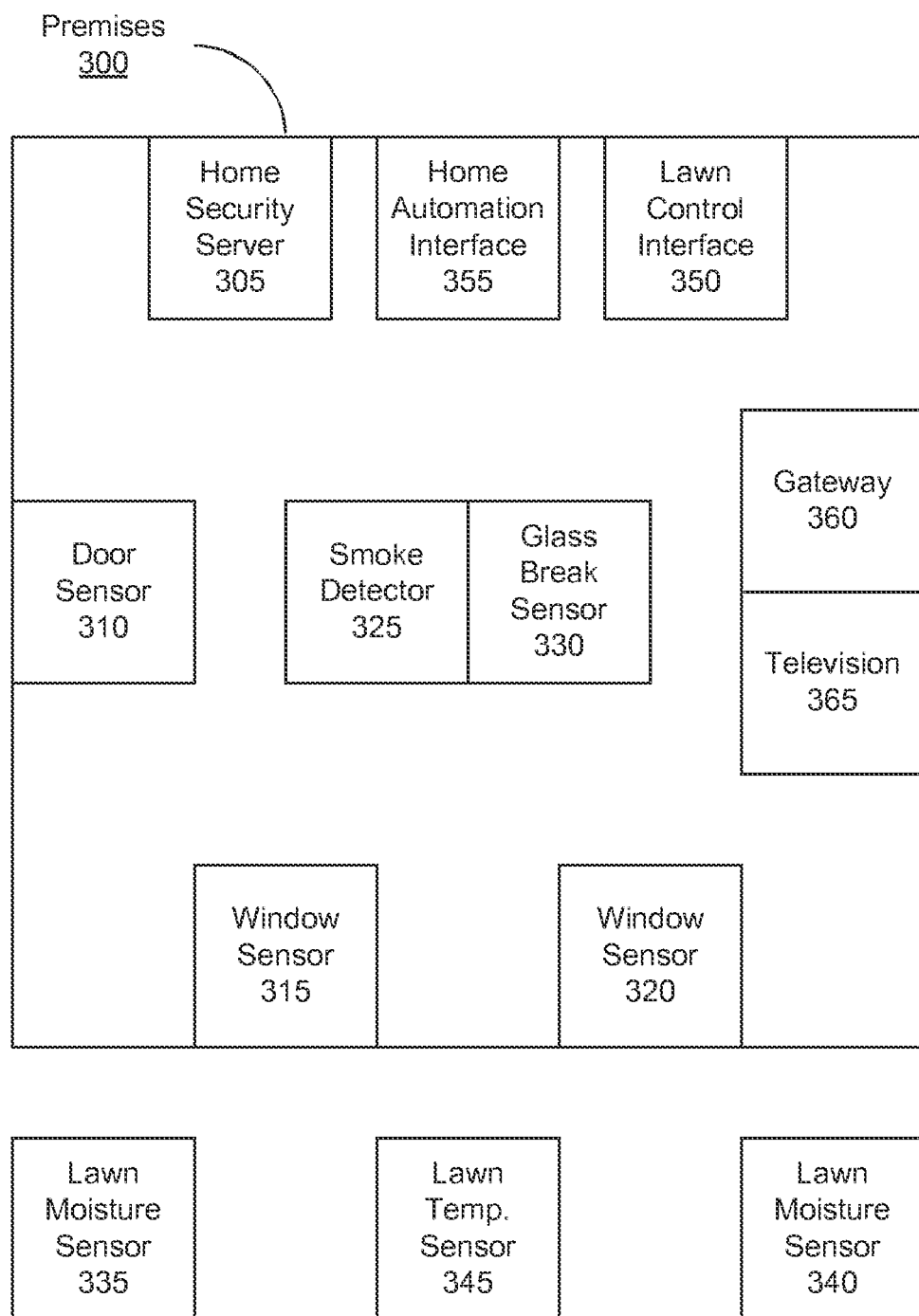
FIG. 3 illustrates an examples premises at which a security system and various sensors may be deployed.

FIG. 3 illustrates an examples premises 300 at which a security system, such as a home security system, may be deployed. As seen in FIG. 3, the security system deployed at premises 300 may include a home security server 305 and a number of sensors that can be configured to detect various occurrences and/or other changes in state(s) at premises 300. For example, the security system deployed at premises 300 may include a door sensor 310 that is configured to detect whether a door at premises 300 is open or closed. In addition, the security system deployed at premises 300 may include a number of window sensors, such as window sensor 315 and window sensor 320, that are each configured to detect whether a particular window is open or closed. The security system deployed at premises 300 also may include a smoke detector 325 that is configured to detect whether smoke is present at premises 300, and further may include a glass break sensor 330 that is configured to detect the sound associated with a window or other glass object breaking at the premises. Any and/or all of these sensors may be communicatively coupled via one or more wired and/or wireless connections to home security server 305, which may send and/or receive signals to and/or from the various sensors. In addition, by analyzing signals received from the various sensors, home security server 305 may be able to determine whether one or more alert criteria are met, and accordingly, whether an alarm should be triggered and/or whether other alert actions should be taken. While FIG. 3 shows a particular number and configuration of sensors which may be deployed at a premises and monitored by security server 305 in one embodiment, any number of sensors, as well as any number of security servers and/or different types of sensors, may be similarly deployed at monitored in other embodiments.

For instance, some of the sensors that may be deployed at a premises and monitored by security server 305 in other embodiments include flood sensors, gas leak sensors, and medical sensors. A flood sensor may, for instance, be configured to detect the presence of water and/or moisture in a particular area, such as on the floor of the basement of the premises, which may be indicative of a flood or water leak. A gas leak sensor may, for instance, be configured to detect the presence of natural gas in a particular area, such as in one or more rooms and/or other enclosed areas of the premises, which may be indicative of a leak in a gas line servicing the premises. A medical sensor may, for instance, be configured to detect whether a person in the premises requires medical attention, and in some instances, may comprise a fall sensor that may be configured to detect if an elderly person at the premises has suffered a fall (and/or may be activated by such an elderly person in the event of such a fall). As illustrated in these examples, these sensors may provide various safety and/or medical functions in some embodiments.

In addition to including a number of sensors that provide various security and/or safety functions (e.g., door sensor 310, window sensors 315 and 320, smoke detector 325, etc.), premises 300 also may include a number of other sensors and systems that enable other types of functions to be monitored and controlled (e.g., by the security server 305). For example, premises 300 also may include one or more lawn moisture sensors, such as lawn moisture sensor 335 and lawn moisture sensor 340, which may be installed in an exterior area of the premises 300, such as in the front lawn or in the backyard. Premises 300 also may include one or more lawn temperature sensors, such as lawn temperature sensor 345, which also may be installed in an exterior area of the premises. In some instances, the security server 305 may, for example, use data obtained from these lawn sensors and/or other sensors to determine when certain areas of the lawn might need watering. In addition, the security server 305 may communicate with a lawn control interface 350 at the premises 300 to initiate, cancel, and/or scheduling watering activity (e.g., so as to water the area(s) of the lawn that might need watering, as determined using the sensor data).

In some embodiments, the lawn control interface 350 may be a sprinkler panel or some other system or device that is independent from, but communicatively coupled to, the security server 305, while in other embodiments, the lawn control interface 350 may be incorporated into the security server 305 (e.g., as integrated hardware and/or software). In addition, the various lawn sensors at the premises 300 may, in some instances, be directly monitored by, and be in communication with, the security server 305, and in other instances, these lawn sensors instead may be connected to the lawn control interface 350 and accessed by the security server 305 via the lawn control interface 350.

In some embodiments, the lawn sensors (e.g., lawn moisture sensors 335 and 340, lawn temperature sensor 345, etc.) may be small, simple, and/or low-power devices that include one or more sensor components (e.g., to measure particular conditions/states), a power source (e.g., a battery, a solar cell, etc.), and a wireless communication interface (e.g., to send and receive wireless signals, such as cellular signals, WLAN signals, or other radio signals). These sensors may be installed by a resident of the premises 300 and can be communicatively connected to the security server 305 via their respective wireless communication interfaces. Several techniques for how these sensors may be registered with and monitored by the security server 305 will be discussed in greater detail below.

In addition to communicating with the lawn control interface 350 (e.g., to control watering activity at the premises 300), the security server 305 also may communicate with a home automation interface 355. This communication may, for example, enable the security server 305 to control other systems at the premises, such as HVAC systems, lighting systems, home appliances, pet monitoring devices and systems (e.g., electronically controlled dog doors, litter boxes, aquariums, terrariums, etc.), and other systems that might be connected to and/or controllable via the home automation interface 355. In addition, like the lawn control interface 350, the home automation interface 355 may, in some embodiments, be a control panel or some other system or device that is independent from, but communicatively coupled to, the security server 305. In other embodiments, the home automation interface 355 may be incorporated into the security server 305 (e.g., as integrated hardware and/or software).

While lawn control interface 350 and home automation interface 355, along with their various associated sensors and/or systems, are discussed here as illustrations of the types of interfaces, sensors, and systems that may be controlled by the security server 305, these are only some examples of the interfaces, sensors, and systems that may be controlled by the security server 305 in some embodiments. In other embodiments, other types of interfaces, sensors, and/or systems may similarly be controlled by the security server 305 instead of and/or in addition to those discussed in the examples above. For example, other systems and sensors, such as pet management systems and their associated sensors (e.g., one or more pet monitoring sensors), one or more package sensors (e.g., one or more sensors that may be configured to detect the presence of a package at an exterior door of the premises), and/or one or more pool sensors (e.g., one or more sensors that may be configured to monitor various aspects of a swimming pool at the premises, such as the temperature, water level, and/or pH level of the pool), may similarly be monitored and controlled by the security server 305 via one of these interfaces and/or via one or more other interfaces, as discussed in greater detail below.

In addition to including a home security server, a number of sensors, and various other systems, premises 300 also may include a gateway 360 and a display, such as a television 365. In some embodiments, gateway 360 may implement one or more aspects of the gateway interface device 111, which was discussed above with respect to FIG. 1. This may, for instance, include receiving and/or decoding content via an information distribution network, as well as displaying and/or playing back such content on television 365. In some additional and/or alternative embodiments, gateway 360 and home security server 305 may be implemented in a single device that, for example, is configured to both monitor and control the various sensors and systems that are installed at premises 300 and facilitate electronic communications (e.g., with a local office, such as local office 103, via one or more communication networks, such as network 100, etc.).

During its typical course of operation, home security server 305 may monitor signals received from the various sensors located at the premises 300 and also may communicate with one or more other devices that are located at and/or used in the premises, such as lawn control interface 350 and home automation interface 355, as well as various devices and systems controlled by these interfaces. In addition, in monitoring the signals received from the various sensors, home security server 305 may, in implementing one or more aspects of the disclosure discussed in greater detail below, classify some of the information received from the sensors as critical data to be processed by the security server 305 itself, and further may classify other information received from the sensors as non-critical data to be processed remotely by a network server or "cloud" server, such as application server 107.

In some instances, the security server 305 may classify particular sensor data as critical or non-critical based on the particular sensor data being used in monitoring and/or controlling a certain type of function (e.g., a home security function, a home automation function, a lawn control function, etc.). Additionally or alternatively, the security server 305 may classify particular sensor data as being critical or non-critical based on the particular sensor data being collected by a certain type of sensor (e.g., a security sensor, such as a motion detector or a smoke detector; a lawn sensor, such as a lawn moisture sensor; etc.). Various aspects of this classification and the other processing that may be performed by a security server, such as home security server 305, will now be discussed in greater detail, beginning with a discussion of the flowchart illustrated in FIG. 4.

Figure 4:
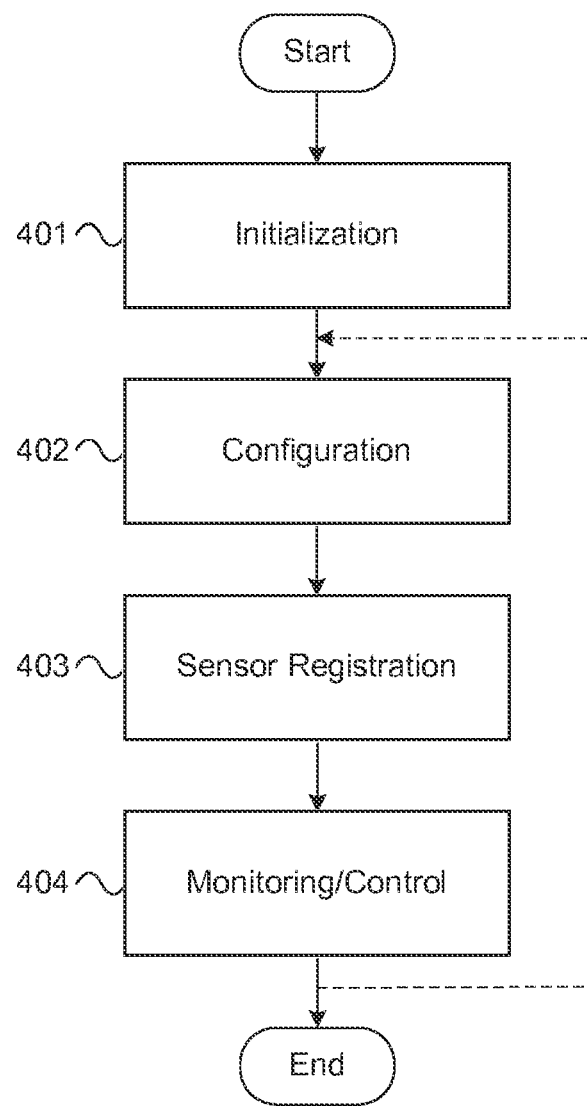
FIG. 4 illustrates a flowchart that depicts an example method of processing sensor data according to one or more aspects of the disclosure.

FIG. 4 illustrates a flowchart that depicts an example method of processing sensor data according to one or more aspects of the disclosure. In particular, FIG. 4 provides an overview of the processing routines that may be performed by a security server, such as security server 305, in implementing one or more aspects of the disclosure.

As seen in FIG. 4, the method may begin in step 401 when a security server, such as security server 305, is initially powered on and initialized. During this initialization, the security server may perform a number of steps to load previous settings, activate various interfaces, and establish a number of connections to other systems and devices. An example of an initialization subroutine that may be performed by a security server in some embodiments will be discussed in greater detail below with respect to FIG. 5.

After initialization, the security server may, in step 402, perform a configuration subroutine. During such a configuration subroutine, the security server may provide a user with one or more user interfaces that enable the user to define and modify a number of different settings that affect the operations of the security server. An example of a configuration subroutine that may be performed by the security server in some embodiments will be discussed in greater detail below with respect to FIG. 6.

Next, the security server may, in step 403, perform a sensor registration subroutine. During the sensor registration subroutine, the security server may, for example, identify a new sensor that has been installed at the premises 300, and further may perform a number of steps that enable the new sensor to be monitored by the security server. An example of a sensor registration subroutine that may be performed by the security server in some embodiments will be discussed in greater detail below with respect to FIG. 7.

Thereafter, the security server may, in step 404, perform a monitoring and control subroutine, in which the security server may receive data from various sensors and control various systems that may be located at the premises based, for example, on the received sensor data. An example of a monitoring and control subroutine that may be performed by the security server in some embodiments will be discussed in greater detail below with respect to FIG. 8.

Subsequently, the security server may continue to execute the method illustrated in FIG. 4 in a loop (e.g., by repeatedly executing the configuration subroutine, sensor registration subroutine, and monitoring and control subroutine), or the method may end (e.g., if the security server is switched off).

As indicated above, the method illustrated in FIG. 4 provides an overview of the processing routines that may be performed by a security server in some embodiments. In other embodiments, additional and/or alternative subroutines may be performed in addition to and/or instead of those shown in FIG. 4. Each of the subroutines introduced above will now be described in turn below.

Figure 5:
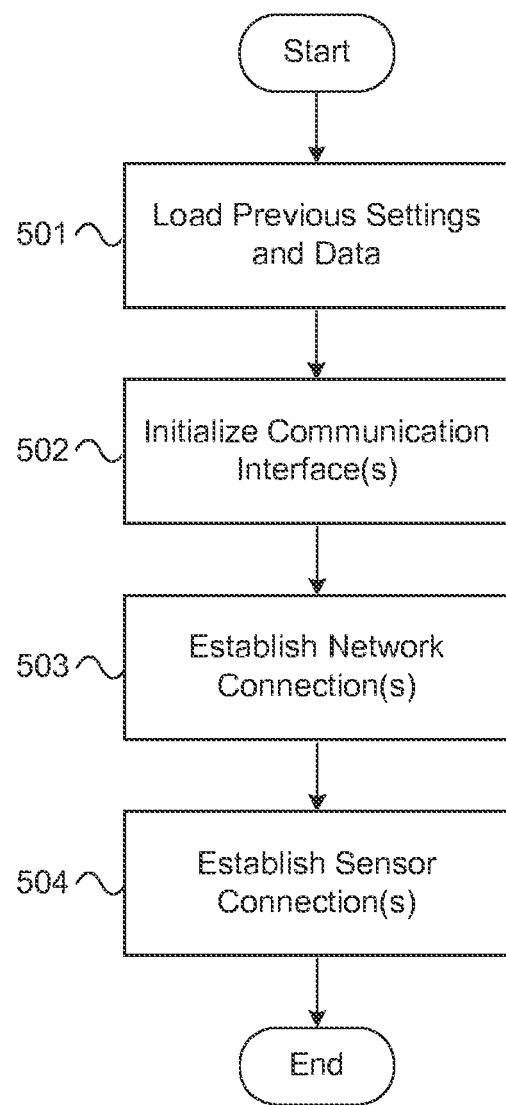
FIG. 5 illustrates an example of an initialization subroutine that may be performed by a security server in one or more embodiments.

FIG. 5 illustrates an example of an initialization subroutine that may be performed by a security server in one or more embodiments. This initialization subroutine may, for example, be executed by a security server, such as home security server 305, when it is initially powered on.

As seen in FIG. 5, the initialization subroutine may begin in step 501, in which the security server may load previous settings and data. These settings and data may, for instance, include information stored by the security server (e.g., in non-volatile memory) from a previous session. In some instances, this information may include previously-defined connection settings (e.g., used in establishing connections with various local and/or remote systems, devices, sensors, etc.), previously-defined sensor settings (e.g., used in receiving, classifying, and/or processing data from various sensors), and other settings.

In step 502, the security server may initialize one or more communication interfaces. This may, for instance, include powering on and configuring one or more communications subsystems that may be included in the security server, such as a cellular communications subsystem (e.g., which facilitates communications via one or more cellular networks), a WLAN communications subsystem (e.g., which facilitates communications via one or more wireless local area networks), and one or more other communications subsystems (e.g., which facilitate communications via other types of networks).

In step 503, the security server may establish one or more network connections. For example, the security server may establish connections with one or more remote servers (e.g., application server 107), one or more local systems and/or devices (e.g., lawn control interface 350, home automation interface 355, etc.), and/or other local devices (e.g., gateway 360, one or more mobile devices, other user computing devices, etc.).

In step 504, the security server may establish communications with one or more sensors. For example, the security server may, in step 504, establish connections with sensors at the premises that were previously registered with the security server (e.g., during a previous session), so as to facilitate collection of sensor data from these sensors.

After performing one or more of these steps of this initialization subroutine, the security server then may perform a configuration subroutine in which a number of user interfaces may be provided to allow various aspects of the security server to be configured.

Figure 6:
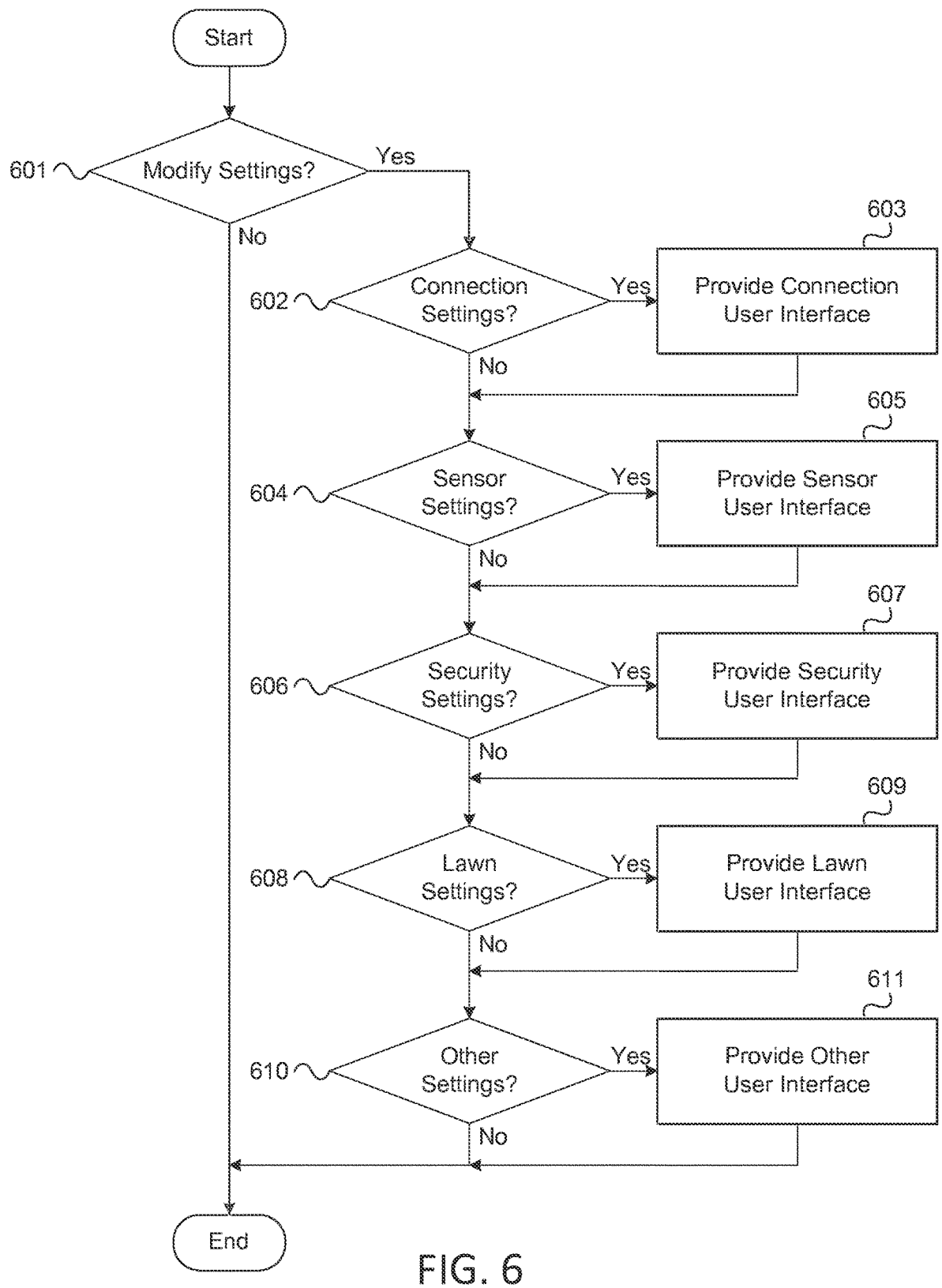
FIG. 6 illustrates an example of a configuration subroutine that may be performed by a security server in one or more embodiments.

FIG. 6 illustrates an example of a configuration subroutine that may be performed by a security server in one or more embodiments. As seen in FIG. 6, the configuration subroutine may begin in step 601, in which the security server (e.g., security server 305) may determine whether a request to modify settings has been received. Such a request may, for instance, be received as input provided by a user either directly to the security server or via a user device that is connected to and/or otherwise in communication with the security server (e.g., gateway 360, a mobile device, etc.).

If a request to modify settings has not been received, then the configuration subroutine may end, and the security server may simply continue operations based on previously defined settings (e.g., as loaded during the initialization subroutine discussed above). Alternatively, if a request to modify settings has been received (e.g., in step 601), then the security server may evaluate a series of decisions to provide one or more user interface(s) to the user that allow for modification of the desired type(s) of settings. For example, once a request to modify settings has been received (e.g., in step 601), the security server may prompt the user to provide input specifying which type(s) of settings are to be modified (e.g., by displaying a menu or causing such a menu to be displayed). Such a prompt or menu, as well as any and/or all of these user interfaces may, for instance, be generated by the security server and displayed on another device that is connected to and/or otherwise in communication with the security server, such as the gateway and/or television at the premises, a mobile device, or some other computing device that is located at the premises.

In evaluating the series of decisions, for example, the security server may determine, in step 602, if a request to modify connection settings has been received. If such a request has been received, then in step 603, the security server may provide a connection configuration user interface. Such a user interface may, for example, enable the user to modify cellular connection settings, WLAN settings, and/or other network settings that are used by the security server and/or other devices at the premises.

If it is determined that a request to modify sensor settings has been received (e.g., in step 604), then the security server may provide a sensor configuration user interface (e.g., in step 605). Such a user interface may, for example, enable the user to define and modify settings for various sensors that have been registered with the security server. These settings may, for example, include sensor prioritization settings which may be used by the security server in determining whether data collected from a particular sensor should be considered critical or non-critical.

If it is determined that a request to modify security settings has been received (e.g., in step 606), then the security server may provide a security configuration user interface (e.g., in step 607). Such a user interface may, for example, enable the user to define and modify settings that are used by the security server in providing various home security functions. These settings may, for example, include the desired levels of sensitivity of motion sensors and glass break sensors at the premises, the desired lengths of time for exit countdown timers and alarm abort windows, and/or the like. In some instances, these sensor settings may be stored by the security server as sensor profiles that can be used as templates for the settings to be applied to new sensors that are subsequently installed at the premises and registered with the security server. In these instances, the security configuration user interface (e.g., provided in step 607) may additionally or alternatively include one or more menus that enable a user to define, modify, and otherwise manage these sensor profiles.

If it is determined that a request to modify lawn monitoring settings has been received (e.g., in step 608), then the security server may provide a lawn monitoring configuration user interface (e.g., in step 609). Such a user interface may, for example, enable the user to define and modify settings that are used by the security server in controlling various lawn monitoring functions at the premises. These settings may, for example, include desired moisture and temperature levels for various areas of the premises, preferred watering schedules, water usage limitations (e.g., drought considerations, budget considerations, etc.), and/or the like.

If it is determined that a request to modify other settings has been received (e.g., in step 610), then the security server may provide an appropriate user interface to enable modification of these other settings (e.g., in step 611). Such a user interface may, for example, enable the user to modify home automation settings (e.g., HVAC settings, lighting settings, pet monitoring settings, etc.) and/or other settings that may be used by the security server in performing various monitoring and control functions. For example, a user interface provided by the security server in step 611 may, in some instances, enable a user to control various aspects of a pet management system, such as settings that define when electronic dog doors at the premises can be automatically locked and unlocked (and/or opened and closed), settings that define the desired temperature(s) and pH level(s) for one or more aquariums at the premises, settings that define the time(s) at which an electronic litter box should clean itself, and/or other settings that may similarly be used in monitoring and/or controlling various aspects of such a pet management system.

After performing one or more steps of the configuration routine, the security server then may perform a sensor registration subroutine in which one or more new sensors may be registered with the security server (e.g., to facilitate monitoring of these new sensors).

Figure 7:
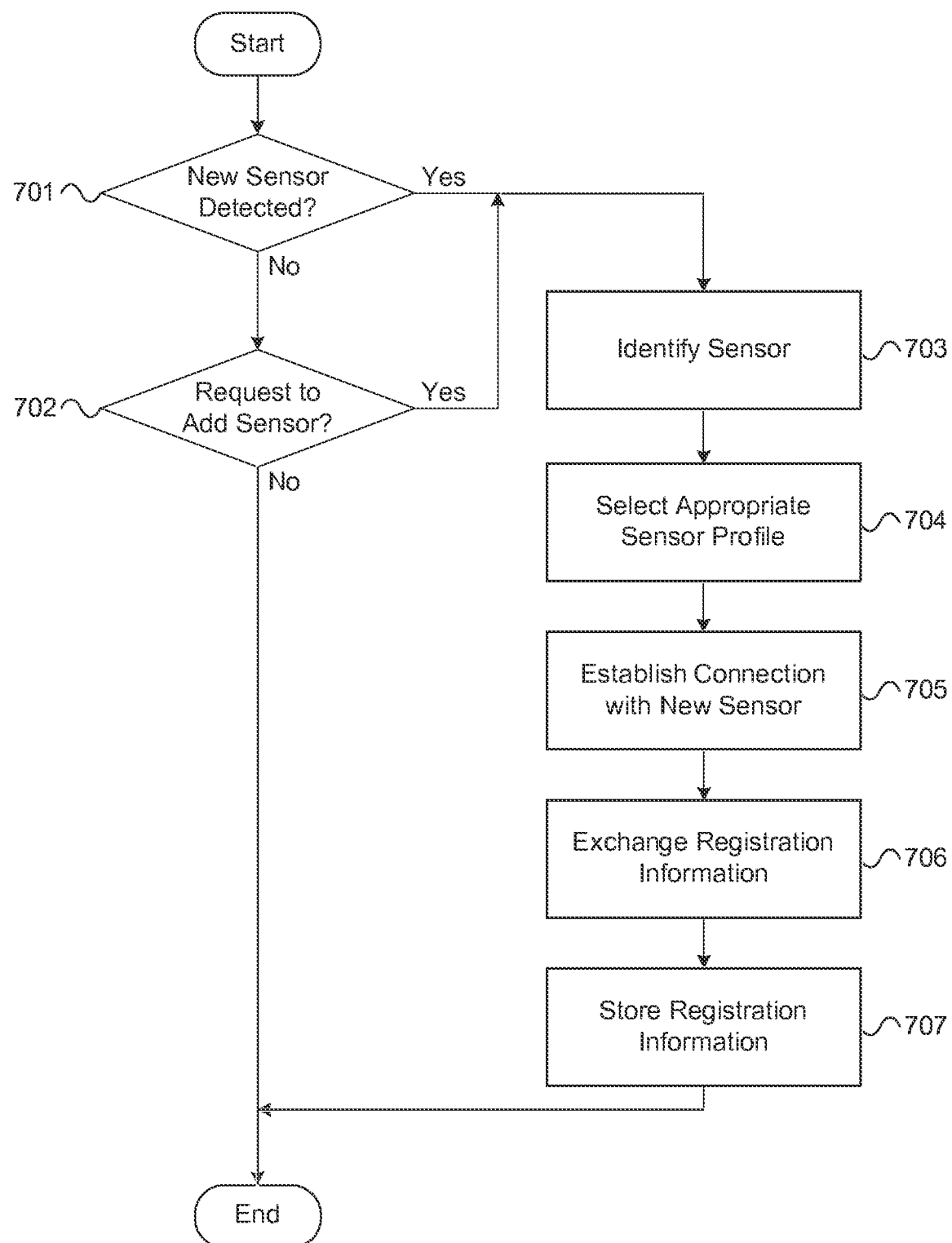
FIG. 7 illustrates an example of a sensor registration subroutine that may be performed by a security server in one or more embodiments.

FIG. 7 illustrates an example of a sensor registration subroutine that may be performed by a security server in one or more embodiments. As seen in FIG. 7, the sensor registration subroutine may begin in step 701, in which the security server (e.g., security server 305) may determine whether a new sensor has been detected. The security server may, for example, detect a new sensor based on receiving a wireless signal that is transmitted by a newly installed sensor at the premises. Such a signal may be a locally broadcast radio signal that, for instance, is transmitted by the sensor once it is installed and switched on by the user. In other instances, the security server might receive such a signal via a local network, such as a local wireless network at the premises to which the sensor might have connected.

If a new sensor is not detected (e.g., in step 701), then in step 702, the security server may determine whether a request to add a new sensor has been received. In some instances, the security server may receive such a request as input from a user (e.g., as a result of the user interacting directly with the security server, as a result of the user interacting with a device that is connected to or otherwise in communication with the security server, such as a mobile computing device, etc.). For example, the security server may receive a request to add a new sensor from a mobile device (e.g., a smart phone, tablet computer, etc.) that is used by a resident of the premises at which the security server is deployed.

In some instances, a request to add a new sensor (e.g., received by the security server in step 702) may include various types of information about the new sensor that is to be registered with the security server. For example, such a request may include identification information that specifies a unique identifier associated with the sensor, type information that specifies what type of sensor the sensor is (e.g., a motion sensor, a smoke detector, a lawn moisture sensor, etc.), location information that specifies where the sensor has been installed (e.g., in terms of geographic coordinates, in terms of relative area, such as "in the backyard," etc.), and/or other information about the sensor that may, for instance, be used by the security server in establishing a connection with the sensor and subsequently monitoring data provided by the sensor.

In some instances, a user may submit a request to add a new sensor by sending a picture of the sensor to the security server (e.g., from a mobile device used by the user). In these instances, the request that may be received by the security server (e.g., in step 702) may include such a picture, along with any configuration settings that may have been specified by the user and/or other information that may be used by the security server in registering the new sensor. For example, this other information might include geo-tag information that indicates the location at which the picture was taken, which can then be used by the security server to determine where the sensor is installed. The geo-tag information may, for instance, be generated and/or derived based on satellite positioning services included in the mobile device (e.g., hardware and/or software included in the mobile device that enables the mobile device to receive and process Global Positioning System (GPS) signals).

If the presence of a new sensor was detected (e.g., in step 701) or if a request to add a new sensor was received (e.g., in step 702), then in step 703, the security server may identify the new sensor. In identifying the new sensor, the security server may, for example, interrogate the new sensor in order to obtain information about what type of sensor the new sensor is, where the sensor is located, what firmware version the sensor is running, and/or the like.

In some instances in which a request to add a sensor is received and the request includes an image of the sensor, the security server may identify the sensor (e.g., in step 703) based on the image included in the request. In identifying the sensor based on such an image, the security server may, for example, analyze the image using object recognition techniques to determine what type of sensor is being registered (e.g., based on unique physical features of the sensor that are apparent in the image). Additionally or alternatively, if the new sensor includes a code printed on its casing (e.g., a barcode, a quick response (QR) code, etc.), the security server may use the code to identify the sensor, as such a code may be visible in the image. In some instances, the code printed on a sensor can be used in obtaining additional and/or alternative information about the sensor, such as information that may be used in establishing a connection with the sensor (e.g., a MAC address for a communication interface included in and/or used by the sensor).

In step 704, the security server may select a sensor profile for the new sensor. In selecting a sensor profile, the security server may, for example, select a particular sensor profile from a database of available sensor profiles based on the type of sensor that is being added. Each sensor profile included in the database may, for instance, define default settings that can be used by the security server in connecting to the sensor, in receiving data from the sensor, in analyzing the sensor data, and in otherwise monitoring and managing the sensor. Among other things, such a sensor profile may specify a default priority level to be used by the security server when receiving sensor data from the sensor, and this priority level may, for instance, affect whether the security server considers the sensor data provided by the sensor to be critical or non-critical.

In some instances in which the new sensor is being added based on a request which included an image of the sensor, the security server might, in selecting a sensor profile, not only use the image to determine what type of sensor is being added (e.g., a motion sensor, a moisture sensor, etc.), but also may analyze the image to identify, in the physical surroundings of the sensor, one or more items being monitored by the sensor. This additional information can then be used by the security server in selecting an appropriate sensor profile. For example, if a lawn moisture sensor is being added using a picture of the sensor in its installed location, then analyzing the picture may include identifying one or more plants (e.g., a rose bush, a lemon tree, etc.) that are being monitored by the sensor, which can then be used by the security server to select a sensor profile with monitoring settings that are optimized for these plants.

For example, in identifying one or more plants that are being monitored by a sensor (e.g., based on the received image), the security server may access, retrieve, and/or otherwise obtain botany information for the one or more plants that are identified in the image. This botany information may, for instance, be used by the security server in determining threshold levels and/or optimal levels for moisture, temperature, and/or the like for each of the one or more plants that are being monitored. Additionally or alternatively, this information may enable the security server to control watering activity (and/or other systems) so as to maintain these threshold levels and/or optimal levels, as discussed in greater detail below.

In step 705, the security server may establish a connection with the new sensor that is being added. For example, the security server may establish a data connection with the new sensor via a local wireless network. In addition, the data connection may, for instance, enable the security server to exchange registration information with the new sensor and/or receive data from the sensor that is indicative of the conditions being monitored by the sensor.

In step 706, the security server may exchange registration information with the new sensor. In exchanging registration information with the new sensor, the security server may, for instance, provide the sensor with a preferred network address, port, and/or the like to use in sending data to the security server, and the security server may obtain, from the sensor, additional information that may be used in identifying data received from the sensor. For example, the security server may obtain, from the sensor, a unique sensor identifier which may be included in the header information of data packets sent by the sensor.

In step 707, the security server may store the registration information received from the sensor in step 706. In storing this registration information, the security server may, for example, store the registration information received from the sensor in a data table or other data set that is created and maintained by the security server and in which information about various sensors being monitored by the security server is stored. Such a data table may include, for each sensor being monitored by the security server, identification information, connection information, sensor type information, sensor function information, priority information, location information, and/or other information. For each sensor, the location information included in the table may, for example, be indicative of the position at which the particular sensor is installed (e.g., in terms of geographic coordinates, as a relative description of where the sensor is, such as "interior/bedroom" or "exterior/lawn," etc.). An example of such a table, labeled TABLE A, is illustrated below.

TABLE A

| Sensor ID | Connection Info | Sensor Type | Sensor Function | Priority Setting | Location Information |
|---|---|---|---|---|---|
| 1-1A | 192.168.1.102 | Motion Detector | Security | Critical | Interior/Entry Hallway |
| 1-2B | 192.168.1.103 | Moisture Sensor | Lawn Monitoring | Non-Critical | Exterior/Front Lawn |

In some instances, in addition to storing and maintaining information that specifies a priority setting for each sensor (e.g., in terms of each sensor and its associated data being "critical" or "non-critical"), the security server also may store and maintain information that prioritizes some sensors over others (e.g., based on the identity of a particular sensor; based on type of sensor; based on the area(s) in which sensor(s) are located; etc.). For example, the security server may store and maintain information that prioritizes security sensors over lawn sensors. As another example, the security server may store and maintain information that prioritizes interior sensors (e.g., those inside a house or building on the premises) over exterior sensors (e.g., those outside a house or building, such as in the lawn or a garden). This additional priority information may, in turn, affect whether the security server classifies data received from these sensors as critical or non-critical, particularly in instances where sensor data is received from both higher priority sensors and lower priority sensors.

After performing one or more steps of the sensor registration subroutine, the security server then may perform a sensor monitoring and control subroutine in which the security server may receive data from various sensors and control various systems based on this sensor data.

Figure 8:
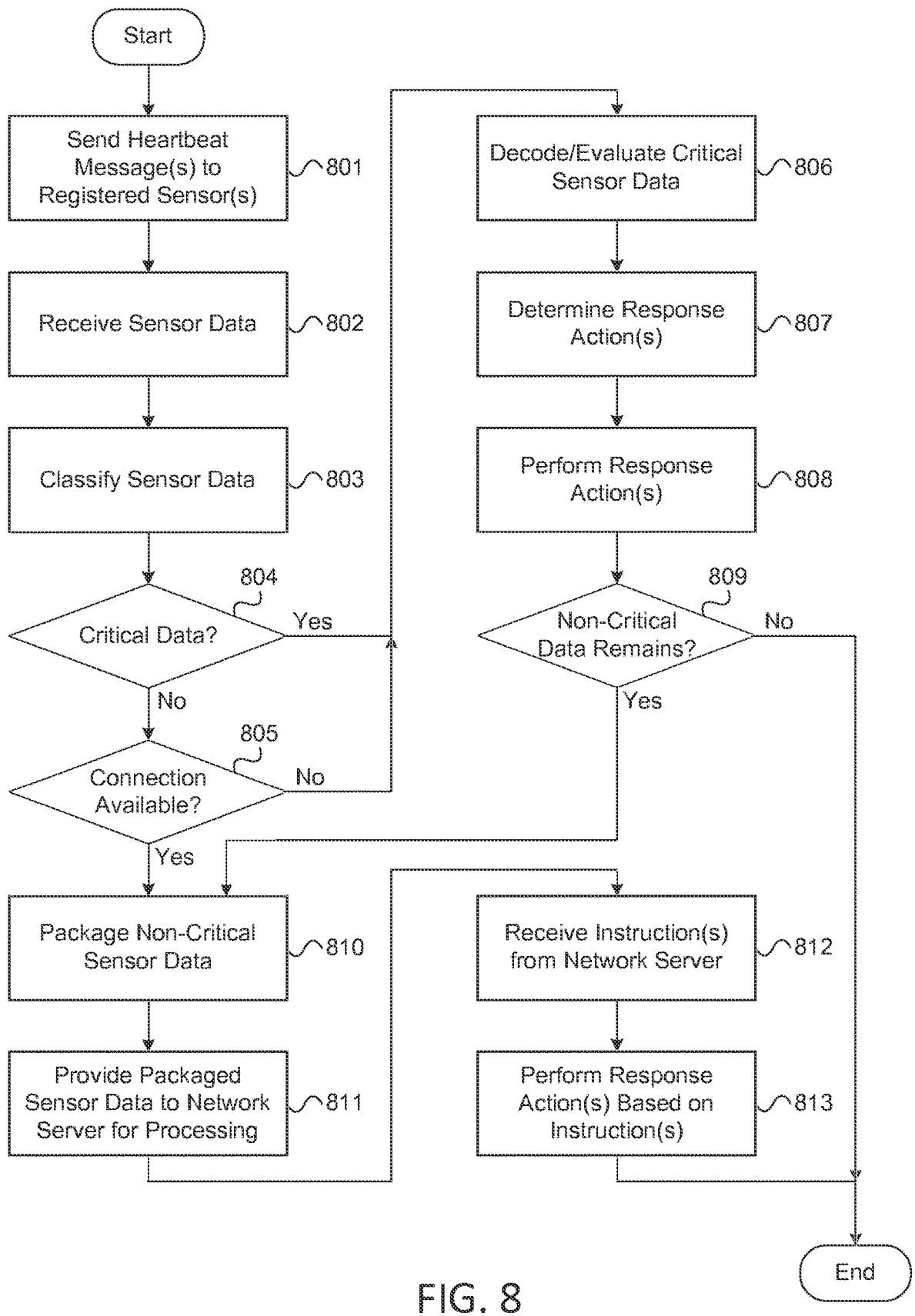
FIG. 8 illustrates an example of a sensor monitoring and control subroutine that may be performed by a security server in one or more embodiments.

FIG. 8 illustrates an example of a sensor monitoring and control subroutine that may be performed by a security server in one or more embodiments. As seen in FIG. 8, the sensor monitoring and control subroutine may begin in step 801, in which the security server (e.g., security server 305) may send one or more heartbeat messages to the registered sensors. In sending these heartbeat messages, the security server may, for instance, send a heartbeat message to each sensor for which an entry is included in the data table discussed above (e.g., TABLE A). In addition, the one or more heartbeat messages may be configured to cause the one or more sensors that receive these messages to respond to the security server with sensor data that is indicative of their current states and/or indicative of the conditions being monitored by these sensors. Additionally or alternatively, one or more sensors (e.g., one or more of the registered sensors) may be configured to provide periodic or aperiodic data to the security server without receipt of a heartbeat signal.

In step 802, the security server may receive sensor data from the various registered sensors (e.g., responsive to the heartbeat messages sent in step 801). This sensor data may, for each sensor, reflect the current state of the sensor and the conditions that it monitors, and in some instances, may simply include raw signal information collected by the particular sensor.

In one or more embodiments, the sensor data received from the various sensors (e.g., in step 802) may require additional processing and analysis in order to determine what actions, if any, should be taken by the security server in response to the conditions reflected in the sensor data. Rather than simply attempting to perform all of this processing and analysis itself, however, the security server first may classify the received sensor data as being critical or non-critical. Then, the security server may process the critical data itself (e.g., locally at the security server and/or at the premises) and may provide the non-critical data to a remote network server for processing, as described in greater detail below with respect to the subsequent steps of the subroutine shown in FIG. 8. This split processing approach to handling the sensor data may ease the processing burden on the security server, which may enable the security server to make better use of its limited processing resources and provide enhanced performance to the user, particularly with respect to the monitoring and control functions that have been deemed to be more important than others in view of their "critical" classification. Additionally or alternatively, the security server may, in some instances, classify sensor data as critical or non-critical based on the processing capabilities of the security server itself. For example, if the security server is not capable or otherwise unable to process particular sensor data (e.g., if the security server does not have the appropriate software, adequate processing resources, etc. to interpret and/or analyze the particular sensor data), the security server may classify this sensor data as non-critical, so as to cause this sensor data to be provided to, and processed by, a remote network server.

Accordingly, in step 803, the security server may classify the received sensor data. The security server may, for example, classify the sensor data based on which sensor collected the data, which function the sensor data is associated with, various user preferences and/or default settings that may be applicable to the particular sensor or sensor data, and/or other factors. For example, in some instances, certain sensor data may be classified as critical or non-critical based solely on default settings (e.g., obtained from an applicable sensor profile), unless user preferences exist which specify that the particular sensor data should be classified differently. In this way, a user may, for example, be able to control what sensor data is processed locally (and likely more promptly) at the security server and what sensor data is processed remotely in the cloud.

Next, the security server may determine (e.g., in step 804) if any of the received sensor data has been classified as critical or cannot be processed locally. In addition, the security server may determine (e.g., in step 805) if a connection is available to a remote network server, such as a cloud server that is configured to assist the security server in processing non-critical sensor data. If any of the received sensor data has been classified as critical, or if the connection to the remote network server is not available (e.g., in which case the non-critical sensor data may be processed locally by the security server after the critical data is processed), then the security server may perform a series of steps to analyze and respond to the received sensor data.

For example, in step 806, the security server may decode and evaluate the critical sensor data (and/or the non-critical sensor data in instances where the connection to the network server is not available). In decoding and evaluating the sensor data, the security server may, for example, extract raw data from the one or more data messages received from each sensor and analyze the extracted data in order to determine the current state of the particular sensor and the conditions that it is monitoring. For example, in decoding and evaluating sensor data received from an entry door sensor, the security server may extract raw data received from the sensor and analyze the extracted data to determine whether the door is open or closed. As another example, in decoding and evaluating sensor data received from a smoke detector, the security server may extract raw data received from the smoke detector and analyze the extracted data to determine whether a certain amount of smoke (e.g., above a predefined threshold) is present or not.

In step 807, the security server may determine one or more response actions to be performed based on the evaluation of the sensor data. For example, if the security server determined (e.g., in step 806) that sensor data obtained from the door sensor indicates that the front door has been opened, and other state information indicates that the home security system is in an armed state, then the security server may, in determining one or more response actions in step 807, determine that a burglar alarm should be triggered at the premises. As another example, if the sensor data received from the smoke detector indicates that a certain amount of smoke particles (e.g., above a predefined threshold) have been detected at the premises, then the security server may, in determining one or more response actions, determine that a fire alarm should be triggered at the premises.

Subsequently, in step 808, the security server may perform the one or more response actions determined in step 807. This may, for instance, include activating one or more alarms at the premises, contacting one or more residents of the premises (e.g., to alert them of the alarm, to verify the alarm, etc.), and alerting emergency responders and/or other entities to the occurrence of the alarm.

If, after analyzing and responding to the critical sensor data (e.g., in steps 806, 807, and 808 above), any non-critical sensor data has yet to be analyzed, and if the connection to the network server is available, then the security server may, in step 809, proceed with performing a series of steps to provide the non-critical sensor data to the remote server for evaluation. If the connection to the remote server is not available, then the security server may simply process the non-critical sensor data itself (e.g., by decoding and evaluating the non-critical sensor data, as in step 806; by determining one or more response actions, as in step 807; and by performing the one or more response actions, as in step 808). As discussed below, in instances in which non-critical data is provided to the remote server for processing, the remote server may, after evaluating the non-critical sensor data, provide one or more instructions to the security server that indicate how, if at all, the security server should respond to the non-critical sensor data.

For example, in step 810, the security server may package the non-critical data. In particular, possibly without evaluating the non-critical sensor data itself, the security server may encapsulate the non-critical sensor data (e.g., to form one or more data structures that contain the non-critical sensor data). Subsequently, in step 811, the security server may provide the packaged sensor data to the network server for processing (e.g., by transmitting the one or more data structured formed in step 810 to the network server). For example, in packaging the non-critical data, the security server may format the non-critical sensor data in accordance with an Extensible Markup Language (XML) schema. Then, in subsequently providing the packaged sensor data to the network server, the security server may use Hyper Text Transfer Protocol (HTTP) transfer techniques (e.g., HTTP GET and/or POST messages) to send the XML-formatted sensor data over a Transmission Control Protocol/Internet Protocol (TCP/IP) connection to the network server.

In some instances, the cloud processing of this sensor data (e.g., by the network server) may enable more advanced analysis of sensor data (e.g., than might be performed locally at the security server in typical instances). For example, in providing such cloud processing, the network server may be able to account for and/or analyze trends in sensor data, and these trends may, in some instances, cause the network server to determine that an alarm should be triggered and/or that some other action should be performed. As an example, in accounting for and/or analyzing trends in sensor data, the network server may determine that certain sensor measurements have been increasing, decreasing, and/or otherwise changing at a particular rate that is above or below a predetermined threshold, and based on this determination, the network server may determine that an alarm should be triggered and/or that one or more other actions should be performed (e.g., regardless of the absolute value(s) of the sensor measurements in this example).

In step 812, the security server may receive one or more instructions from the network server (e.g., based on the network server's processing of the non-critical sensor data). For example, if the non-critical sensor data included lawn moisture measurements and lawn temperature measurements collected by various lawn sensors (e.g., lawn sensors 335, 340, and 345), the instructions received in step 812 may indicate whether the security server should initiate, schedule, and/or reschedule watering of the lawn.

In step 813, the security server may perform one or more response actions (e.g., based on the instructions received from the network server). For example, if the instructions received in step 812 indicate that the security server should initiate, schedule, or reschedule watering of the lawn, then the security server may communicate with a lawn control interface (e.g., lawn control interface 350) to perform the appropriate action(s) in accordance with the instructions, even though the security server itself has not evaluated the sensor data collected from the lawn sensors.

In one or more embodiments, the security server may use one or more different kinds of networks in communicating with a network server in performing one or more steps of the method discussed above (e.g., in providing the network server with sensor data in step 811 and/or in subsequently receiving instruction(s) from the network server in step 812 based on the server's processing of the non-critical sensor data). In certain embodiments, the security server may utilize one or more aspects of the information distribution network 100 (e.g., discussed above with respect to FIG. 1) to communicate with the network server (e.g., to facilitate cloud processing of sensor data by the network server).

For example, the security server may, in some arrangements, include a dedicated cable modem (which may, e.g., be similar to modem 110) that might be used by security server only in sending sensor data to the network server and in receiving information from the network server. Additionally or alternatively, the network server (which may, e.g., be configured to receive sensor data from one or more security servers, process the received sensor data, and provide instruction(s) to the one or more security servers based on this processing) may be included in and/or incorporated into an application server 107 that is located at central office 103. In still other arrangements, a dedicated uplink path may be provided between the security server and the network server, and this uplink path may be used by the security server in providing sensor data to the network server. Additionally or alternatively, a dedicated downlink path (which may, e.g., be distinct and/or otherwise different from the dedicated uplink path) may be provided between the network server and the security server. This dedicated downlink path may, for instance be used by the network server in providing instructions and/or other information to the security server. While these arrangements are discussed here as examples that may be implemented and/or used in some embodiments, other arrangements may similarly be implemented and/or used in other embodiments.

As illustrated in the examples above, evaluating sensor data, determining a response, and performing response actions may, in some instances, include controlling other systems (e.g., besides the security server) based on the evaluation of the sensor data. In some instances, one of the systems that may be controlled by the security server can be a lawn monitoring and control system, which may monitor the temperature, moisture levels, and other aspects of various parts of lawn(s) and garden(s) at the premises. Such a system may be incorporated into, and/or controlled via, a lawn control interface, such as the lawn control interface 350 discussed above. An example of a watering control subroutine that may be performed by the security server in monitoring and controlling such a system will now be discussed with respect to FIG. 9. In some instances, the example watering control subroutine discussed below may, for example, be performed by the security server in performing steps 806, 807, and 808 of the sensor monitoring and control subroutine discussed above. Additionally or alternatively, this watering control subroutine may be performed by the security server and/or by the remote server in performing steps 811, 812, and 813 of the sensor monitoring and control subroutine.

Figure 9:
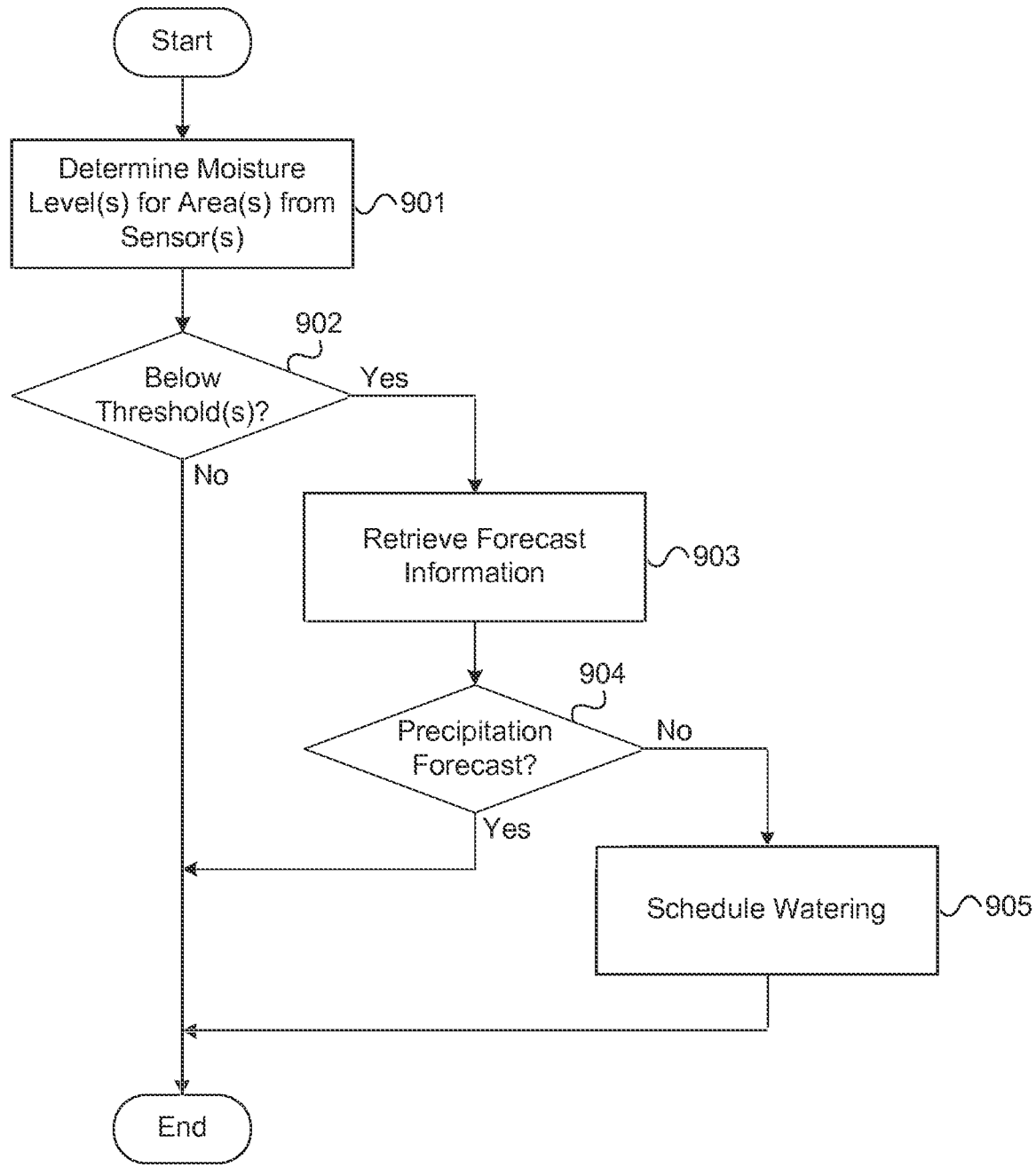
FIG. 9 illustrates an example of a watering control subroutine that may be performed in evaluating sensor data in one or more embodiments.

FIG. 9 illustrates an example of a watering control subroutine that may be performed in evaluating sensor data in one or more embodiments. As seen in FIG. 9, the watering control subroutine may begin in step 901, in which a computing device (e.g., a local security server, such as security server 305; a network server, such as application server 107; etc.) may determine one or more moisture levels in certain areas being monitored by one or more moisture sensors at the premises. For example, depending on whether the data collected by the moisture sensors is considered critical or non-critical, this sensor data may be analyzed locally (e.g., by the security server) or remotely (e.g., by the network server). In addition, in analyzing this sensor data, the computing device that is performing the analysis may evaluate the data collected by the one or more moisture sensors in order to determine the current moisture levels in the areas being monitored. These areas may include combinations of various lawns at the premises, various sub-areas of a particular lawn, various plants in a particular sub-area, and/or particular plants in a specific sub-area. For example, if a particular sub-area includes several rose bushes, each rose bush might have its own dedicated moisture sensor.

In step 902, the computing device may determine if any of the moisture levels are below corresponding thresholds. These thresholds may vary for each of the lawns, areas, plants, etc. being monitored and may, for instance, be defined in sensor profile information and/or in the data table discussed above, which may be used in receiving and evaluating data collected from various sensors.

If the computing device determines (e.g., in step 902) that at least one of the measured moisture levels is below its corresponding threshold value, then the computing device may perform a series of steps to bring the deficient moisture level(s) to the desired level(s). Rather than simply initiating and scheduling watering activity in the one or more areas with deficient moisture levels, however, the computing device may, in accordance with one or more embodiments, obtain and account for forecast information, such as weather forecast information.

For example, in step 903, the computing device may obtain forecast information, such as weather forecast information, for the one or more areas with deficient moisture levels. Such forecast information may, for instance, be obtained from a central server, a publically available internet source, and/or the like. Subsequently, in step 904, the computing device may determine, based on the retrieved forecast information, whether precipitation (e.g., rain, snow, etc.) is forecast in the one or more areas with deficient moisture levels. If the computing device determines that precipitation is not in the forecast for one or more of these areas, then in step 905, the computing device may schedule watering of the one or more areas with deficient moisture levels in which no precipitation (or an insufficient amount of precipitation) is forecast.

In some instances, before scheduling watering of these areas (or any others), the computing device first may account for additional information, such as drought information and budget information. For example, if drought information indicates that the premises is subject to lawn watering restrictions, then the computing device might not schedule watering of any areas, even though certain areas might have deficient moisture levels. As another example, if budget information sets a limit for the amount of water that may be consumed in lawn watering activities during a certain period of time (e.g., in terms of water volume, in terms of cost, etc.), then the computing device might constrain watering activity at the premises so as not to exceed the limit imposed by the budget information. This budget information may, for example, be specified in and/or obtained from preferences set by the user (e.g., during the configuration subroutine discussed above).

In some instances, certain lawns, areas, and/or plants may be prioritized for watering over other lawns, areas, and/or plants. For example, in configuring the system (e.g., during the configuration subroutine discussed above), the user may specify that certain lawns, areas, and/or plants should continue to be watered, even when forecast information, drought information, budget information, and/or other constraints might otherwise limit or prevent such watering activity. For instance, the user may have a rose bush that is especially prized and should accordingly be watered despite any drought or budget considerations. As another example, if drought restrictions are in effect at the premises, the user may configure the system by providing prioritization settings to the system that allow certain lawns, areas, or plants (e.g., the grass in the backyard) to go unwatered so that other lawns, areas, or plants (e.g., the trees in the front yard) may be watered instead.

While some of the examples discussed above illustrate how various lawn sensors can be monitored, and a lawn watering system controlled, by a security server (e.g., security server 305), in other embodiments, other types of sensors and systems may be similarly monitored and controlled instead of and/or in addition to a lawn watering system. For example, the security server may utilize received sensor data to monitor and control pet management systems that may be located at the premises, such as automated dog doors, electronic litter boxes, terrarium temperature control systems, aquarium filtration systems, and the like. In addition, these pet management functions, along with the sensor data associated with these functions, may be classified and processed as critical or non-critical sensor data (e.g., in accordance with the techniques discussed above) based on default settings included in applicable sensor profiles and/or based on user preferences (e.g., defined during the configuration subroutine discussed above).

Having discussed various examples of the types of processing that may be performed by a security server and a network server in receiving, classifying, evaluating, and responding to various types of sensor data, an example of the processing that may be performed (e.g., by a user's mobile computing device) in installing and registering a new sensor with the security server will now be described with respect to FIG. 10.

Figure 10:
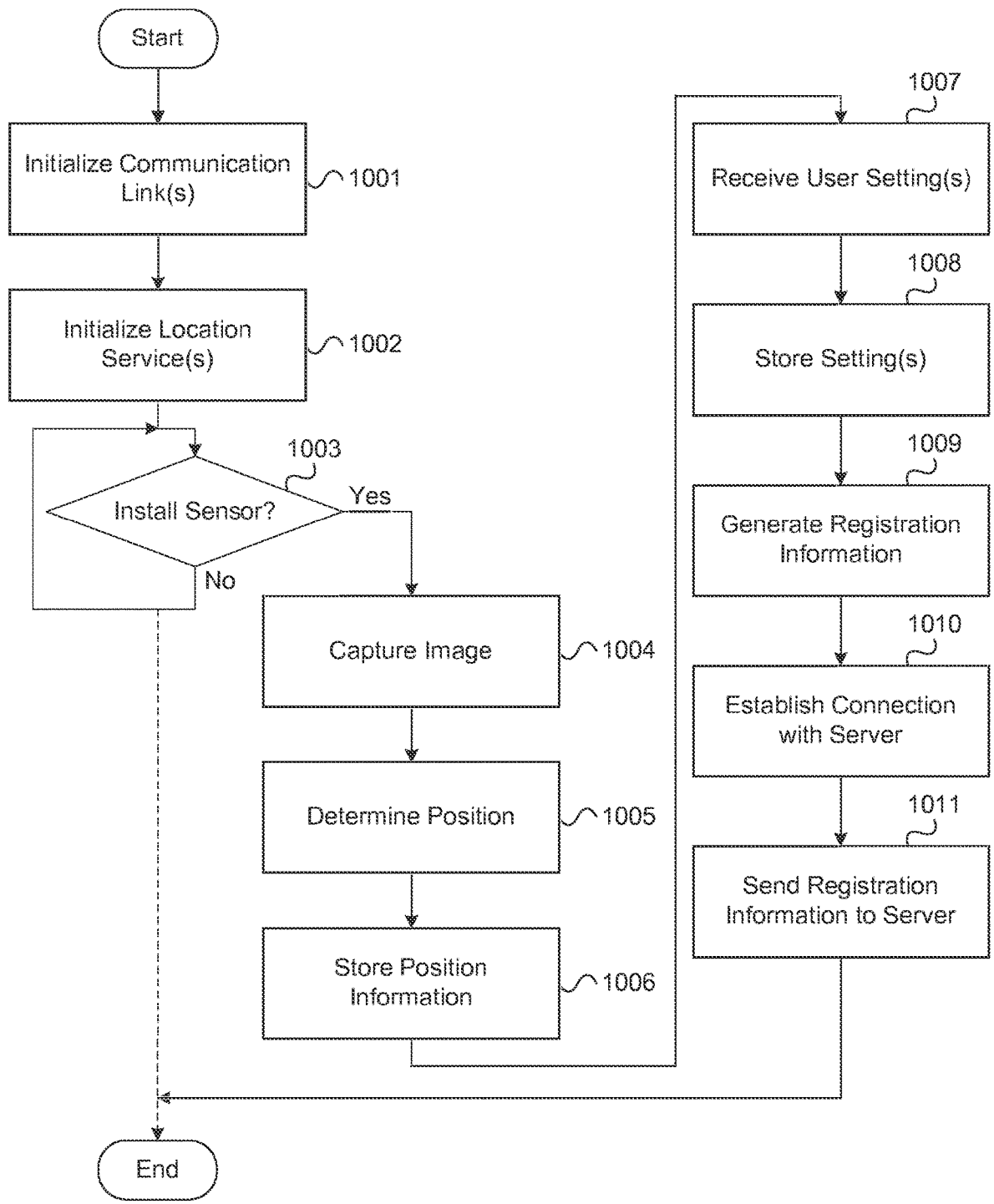
FIG. 10 illustrates a flowchart that depicts an example method of installing one or more sensors according to one or more aspects of the disclosure.

FIG. 10 illustrates a flowchart that depicts an example method of installing one or more sensors according to one or more aspects of the disclosure. In one or more embodiments, the example method shown in FIG. 10 may be performed by a mobile computing device, such as a smart phone or tablet computer that is used by a resident of the premises who also uses and/or controls the security server. Such a mobile computing device may, for instance, implement one or more aspects of the computing device 200 discussed above.

When it is initially powered on, the particular mobile device that is performing the method illustrated in FIG. 10 may first execute a number of configuration steps. For example, in step 1001, the mobile device may initialize one or more communication links. This initialization may, for instance, include initializing one or more cellular interfaces and/or one or more wireless networking interfaces (e.g., GSM/CDMA interfaces, IEEE 802.11a/b/g/n interfaces, other interfaces, etc.), and also may include establishing connections to one or more cellular networks and/or WLAN networks via such interfaces.

In step 1002, the mobile device may initialize one or more location services that allow the mobile device to track its location and provide location information to other devices, such as the security server. This initialization may, for example, include initializing one or more satellite positioning services (e.g., GPS services) and/or other positioning services (e.g., WLAN-based positioning services). In some instances, the mobile device also may obtain an initial position fix once it initializes its location services so as to enable subsequent location tracking.

Thereafter, the mobile device may enter a standby loop in which it establishes and maintains various network connections, processes user input, and performs various functions. Periodically, in performing these and other tasks during such a standby loop, the mobile device may check (e.g., in step 1003) whether a request to install a new sensor has been received. Such a request may, for instance, be received as user input via a user interface provided by the mobile device.

If and when a request to install a new sensor is received, the mobile device, in step 1004, may capture an image (e.g., immediately upon receiving the request, shortly after receiving the request, after prompting the user to aim the camera of the mobile device at the desired subject, etc.). As discussed above, the image captured by the mobile device may, for instance, include a picture of the sensor to be registered (e.g., to allow the sensor to be identified by the security server), as well as the physical surroundings of the sensor (e.g., any nearby plants, other objects, etc. in the vicinity of the sensor). In some instances, the physical surroundings of the sensor that are visible in the image may be used (e.g., by the security server) in identifying plants and other objects that are being monitored by the sensor. This, in turn, may enhance the ways in which the security server can respond to sensor data provided by the sensor, since if the security server knows that a particular plant or other object is being monitored by the sensor, then the security server can obtain and/or load information about the optimal way to care for that plant or other object (e.g., by selecting a sensor profile that specifies ways of maintaining appropriate moisture and/or temperature levels, in the case of a plant, through control of watering activity and/or other functions).

After capturing the image (e.g., in step 1004), the mobile device may, in step 1005, determine the position at which the image was captured. In determining this position, the mobile device may, for example, use one or more location services (e.g., satellite positioning services, cellular positioning services, etc.) to obtain a position fix for the mobile device shortly after the point in time at which the image was captured. Such a position fix may, for instance, indicate the position of the mobile device in terms of geographic coordinates, and these coordinates may subsequently be used to define the location at which the image was captured. In some instances, these coordinates may be embedded into metadata that is included in the image (which may also be referred to as "geo-tagging" the image).

In step 1006, the mobile device may store position information that is indicative of the position at which the image was captured. For example, the mobile device may store the position determined in step 1005 in the memory of the device.

Subsequently, in step 1007, the mobile device may receive one or more user settings for the sensor included in the image. These user settings may, for example, include information specifying what type of sensor is being registered, identification information for the sensor, various preferences that may be used in monitoring the sensor, priority preferences for the sensor, and/or other information. For example, if the image includes a picture of a moisture sensor that the user is installing to monitor a particular rose bush, the user settings received in step 1007 may indicate that the sensor included in the captured image is a moisture sensor, that the sensor is monitoring a particular rose bush, that the sensor is installed at a particular location, that the sensor should be considered higher priority than other sensors (e.g., sensors for nearby grass in the lawn), that the object being monitored should be considered higher priority than other objects (e.g., to prioritize watering of the rose bush over watering of the grass), etc. As another example, the user settings received in step 1007 may include a logical description of where the image was captured (e.g., "in the front yard," "in the back yard," etc.), which might be more useful to, and more easily understood by, the user than the geographic coordinates determined in step 1005.

In step 1008, the mobile device may store settings information (e.g., based on the user settings received in step 1007). Subsequently, in step 1009, the mobile device may generate registration information for the new sensor. The mobile device may, for instance, generate this registration information based on the image data (e.g., captured in step 1004), the position information (e.g., stored in step 1006), and the settings information (e.g., stored in step 1008). In generating the registration information, the mobile device may form one or more data structures to encapsulate these various types of information that may be included in the registration information.

Subsequently, in step 1010, the mobile device may establish a connection with a security server, such as a local security server (e.g., security server 305) that is configured to monitor various sensors at the premises where the mobile device is typically used (e.g., premises 300). Then, in step 1011, the mobile device may send the registration information (e.g., as generated in step 1009) to the security server. This registration information may, for instance, enable the security server to establish a connection with the sensor, monitor sensor data provided by the sensor, and control various systems at the premises based on this sensor data, as in the examples discussed above.

Figure 11:
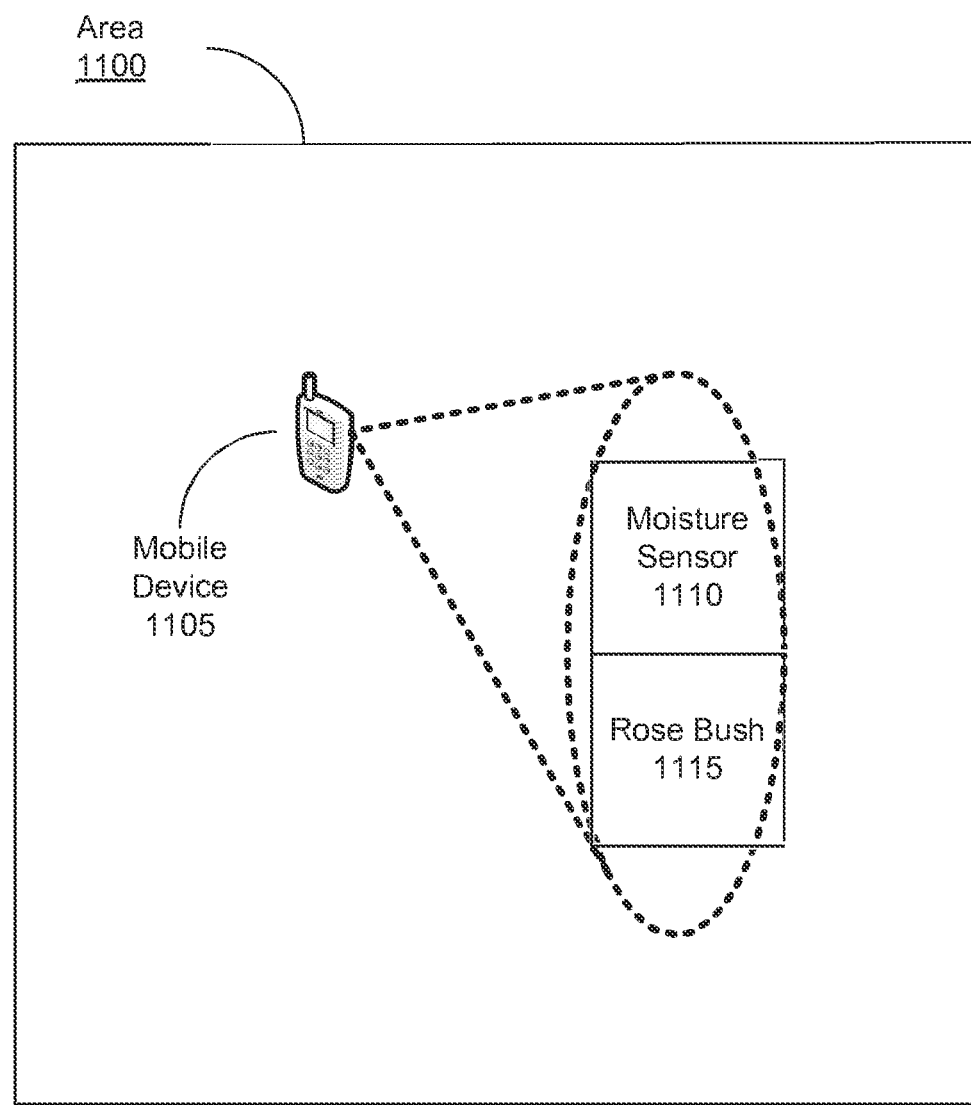
FIG. 11 illustrates an example of a mobile device capturing an image during a sensor installation process according to one or more aspects of the disclosure.

An example of how this sensor registration process may be carried out in practice is depicted in FIG. 11. In particular, FIG. 11 illustrates an example of a mobile device capturing an image of a sensor during a sensor installation process according to one or more aspects of the disclosure.

As seen in FIG. 11, a user of a mobile device 1105 may take the device 1105 into an area 1100 in order to install and register a new moisture sensor 1110 with a security server at the premises in which the area 1100 is located. In the illustrated example, the user may be installing the sensor 1110 in order to monitor a rose bush 1115 that is located in the area 1100. In addition to monitoring the moisture level of the soil around the rose bush 1115 using data provided by the sensor 1110, the security server also may be configured to control watering of the rose bush (e.g., by issuing commands to a lawn watering system, as discussed above).

After placing the moisture sensor 1110 in the desired position and performing any other actions that might be necessary to physically install the sensor, the user of the mobile device 1105 may command the mobile device 1105 to capture an image of the moisture sensor 1110 and the rose bush 1115. Subsequently, the mobile device may, in accordance with the example method discussed above with respect to FIG. 10, perform a number of steps to register the sensor 1110 with the security server. In performing this method, the mobile device may, in some instances, receive input from the user of the device (e.g., in receiving user settings in step 1007). Such input may, for instance, be received via a graphical user interface provided by the mobile device to the user. An example of a user interface that might be displayed during registration of the sensor 1110 is illustrated in FIG. 12.

Figure 12:
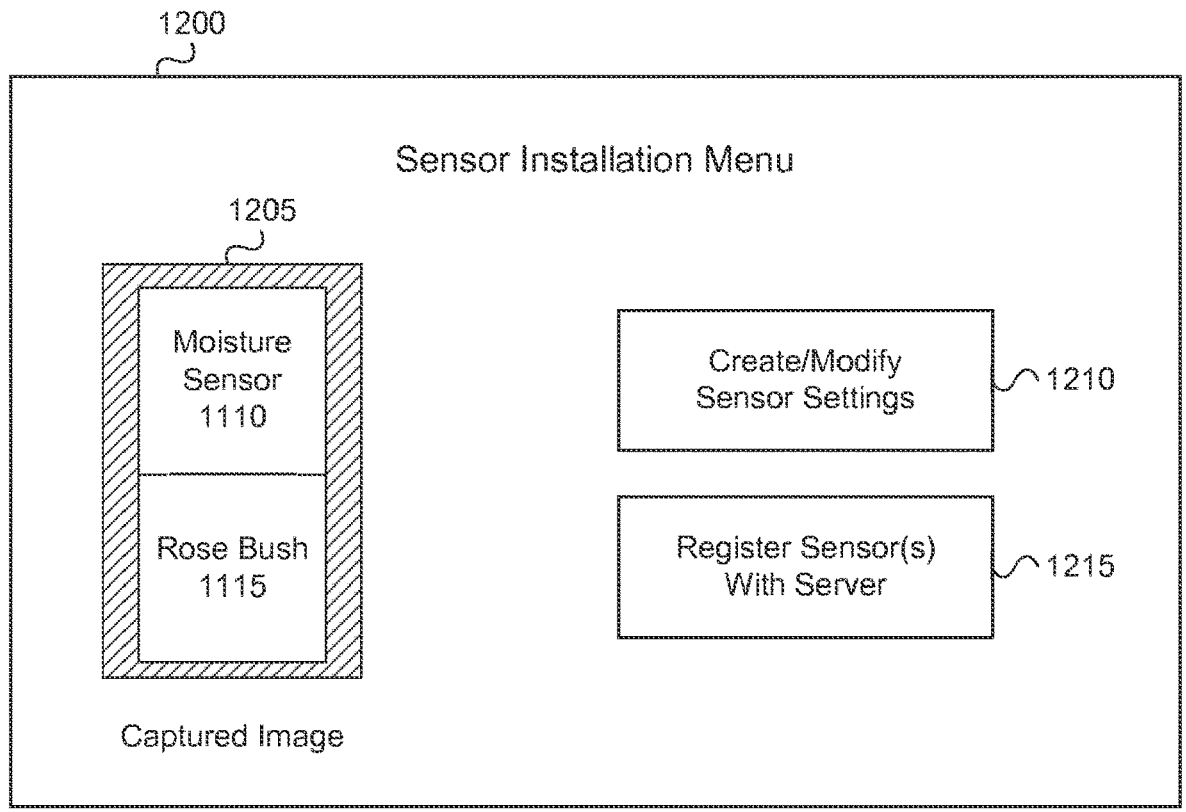
FIG. 12 illustrates an example of a user interface that may be displayed during a sensor installation process according to one or more aspects of the disclosure.

In particular, FIG. 12 illustrates an example of a user interface 1200 that may be displayed during a sensor installation process according to one or more aspects of the disclosure. As seen in FIG. 12, after mobile device 1105 captures the image of the moisture sensor 1110 and the rose bush 1115, the mobile device 1105 may display user interface 1200, which may include a view of the captured image 1205. This view may, for instance, enable the user to decide if the captured image 1205 includes a sufficient amount of the sensor and its surroundings to facilitate registration of the sensor, or if the picture should be re-taken.

In addition, user interface 1200 may include a sensor settings modification button 1210, which if selected by the user, may cause the mobile device to provide a menu that enables the user to specify various settings for the new sensor. User interface 1200 also may include a register button 1215, which if selected by the user, may cause the mobile device to provide the captured image 1205, along with any position information associated with the image and any sensor settings specified by the user (e.g., using the menu available via button 1210), to the security server for registration (e.g., in accordance with the example method discussed above with respect to FIG. 10)

Figure 13:
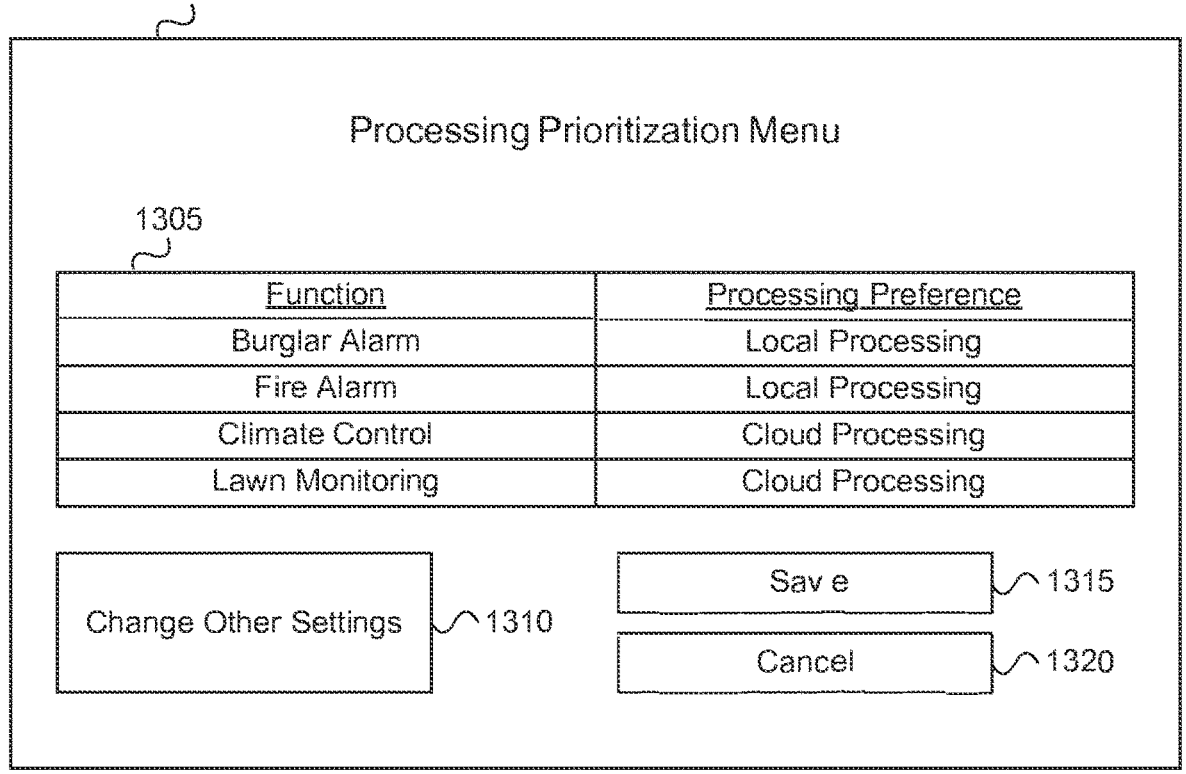
FIG. 13 illustrates an example of a user interface that may be displayed in prioritizing processing of certain types of sensor data in some embodiments.

In addition to providing configuration settings for an individual sensor, a user also may be able to provide user preferences that prioritize certain sensors in relation to others. For example, FIG. 13 illustrates an example of a user interface 1300 that may be displayed in prioritizing processing of certain types of sensor data in some embodiments. In some embodiments, user interface 1300 may be provided by the security server via a connected display (e.g., television 365) or via another device, such as mobile device 1105.

As seen in FIG. 13, user interface 1300 may include a table 1305 in which processing preferences (e.g., local processing or network/cloud processing) may be specified for various monitoring and control functions provided by a security server, such as security server 305. A number of command buttons, such as buttons 1310, 1315, and 1320, also may be included in user interface 1300 to allow a user to change various settings, save changes, and navigate between various menus and interfaces. While the example user interface depicted in FIG. 13 illustrates how certain monitoring and control functions may be prioritized for local processing or network processing relative to each other, in other instances, individual sensors, groups of sensors, particular areas of the premises, etc. may be similarly prioritized for local processing or network processing.

In many of the examples discussed above, various types of sensors have been discussed as examples of sensors that may be used in some embodiments, but other types of sensors may be similarly incorporated into various aspects of the disclosure and be used in other embodiments. For example, in some instances, a temperature sensor may be incorporated into an aquarium or fish pond (e.g., a koi fish pond) to measure the temperature of water in the pond and potentially provide information about the health of the fish living in the pond. In monitoring sensor data provided by this type of sensor, the security server may be configured to alert residents of the premises if the temperature falls outside a predefined range of acceptable temperatures (e.g., by sending them a text message or other electronic communication). In addition, a user of the security server may be able to specify whether sensor data from this sensor should be considered critical or non-critical in accordance with the various techniques discussed above. Still other types of sensors that might be similarly utilized in some embodiments include sensors that can be integrated into pet collars (e.g., which may include tracking devices that can be used to locate the animal wearing the collar), sensors that can be incorporated into pet beds and litter boxes (e.g., which may be monitored to generate alerts about when such beds and boxes require cleaning), and sensors that can be incorporated into aquarium filtration systems (e.g., which may be monitored to generate alerts in situations where such a filtration system fails or needs maintenance).

In other instances, one or more medical sensors also may be incorporated into and/or otherwise used with the various systems, methods, and/or embodiments discussed above. Some examples of the medical sensors that may be used (and monitored, e.g., by the security server discussed above)

include weight sensors, blood pressure sensors, glucose sensors, pulse sensors, oxygen sensors, electrocardiogram (EKG) sensors, and/or other medical sensors. In these instances, the sensor data provided by and/or received from the one or more medical sensors may be encrypted and/or other security measures may be taken to protect the sensor data (e.g., in order to comply with any applicable regulations). In addition, based on user preferences (and/or any necessary consents, waivers, and/or the like) the sensor data may be provided to other entities that are authorized by the user to receive this information, such as the user's doctor. In these instances, because the payload information in the signals and/or messages used in sending and/or receiving the sensor information may be encrypted (e.g., in order to protect the security and/or confidentiality of the sensor data), the signals and/or messages may be routed and/or delivered based on unencrypted header information included in these signals and/or messages, which may, for instance, include sensor type information (e.g., indicating the type of sensor that collected the particular sensor data, e.g., a weight sensor, a blood pressure sensor, a glucose sensor, etc.), registration information (e.g., identifying the particular sensor that collected the sensor data, the particular user with respect to which the sensor data was collected, the particular endpoint(s) to which the sensor data is to be delivered, etc.), and/or other routing information.

In additional and/or alternative instances, some of the systems, methods, and/or other embodiments discussed above may be utilized in other contexts than those illustrated in the examples discussed above. For example, some examples discussed above illustrate how botany information may be accessed, retrieved, and/or otherwise obtained (e.g., by a security server) in monitoring moisture data, temperature data, and/or other sensor data for one or more plants (which may, e.g., be located in a garden or lawn at the premises). In some instances, similar processing may be performed to expand this monitoring to acres of crops. In one example deployment, the security server and/or other devices discussed above could thus be used in monitoring important crops (e.g., vineyards, citrus crops, other crops, etc.) and/or preventing such crops from being damaged by frost or other harmful conditions (e.g., by activating one or more heating systems and/or other protection systems). Other sensor data may additionally or alternatively cause the security server and/or the other devices discussed above to detect an insect infestation in a particular area and cause an insect protection system to be activated (e.g., which may automatically release a pesticide spray or activate another insect deterrent system). In these examples, in addition to monitoring moisture and temperature levels, the security server and/or the other devices discussed above may similarly monitor soil pH levels, nutrient composition, and/or other conditions (e.g., which may trigger other actions to be performed, such as the automated delivery of additional fertilizer).

In other examples, the security server and/or the other devices discussed above may be used in detecting whether and/or when a crop may be ready to be harvested (e.g., based on height, color, thickness, chemical composition, etc.). Sensor data obtained from various sources, such as lasers, video cameras, and spectrometers, may, for instance, facilitate such analysis. Additionally or alternatively, the security server and/or the other devices discussed above may, for instance, receive and/or analyze this information to determine the best course of action for tending to the crop(s) and/or notify various entities (including the owner of the crop(s)) of various changes in state.

In other examples, the security server and/or the other devices discussed above may receive and/or obtain earthquake information, which may, for instance, be used in triggering a warning alarm at a premises in situations where an earthquake is starting or is about to occur. Such an alarm may, for instance, allow occupants to protect themselves by seeking appropriate shelter (e.g., under tables, door frames, etc.). In other instances, similar information may be processed to generate warning alarms in cases of other weather phenomena, such as tornadoes, floods, and hurricanes. In still other instances, this information may be used by the security system and/or the other devices discussed above to control and/or activate other systems at the premises. For example, if the security system and/or the other devices discussed above are deployed at a beach vacation house where no one is currently staying, the security system and/or the other devices may control various systems at the premises to protect the house when it is determined that a storm is approaching. This may, for instance, include automatically lowering window covers (e.g., using the home automation interface discussed above) so as to protect the windows of the house from being broken by flying objects during the approaching storm.

Many aspects of the disclosure have been described in terms of illustrative embodiments. While illustrative systems and methods have been described which embody various aspects, the scope of the disclosure is not limited to these embodiments. Modifications may, for example, be made, particularly in light of the explanation provided above. For instance, each of the features discussed in the examples above can be utilized alone or in combination or subcombination with elements discussed in other examples. Any of the systems and methods (or parts thereof) may be combined with any other systems, methods, and parts discussed above.

Any and/or all of the methods discussed herein can be embodied as computer-executable instructions stored on a computer-readable medium, such as a non-transitory computer-readable memory.

Thus, modifications may be made without departing from the true spirit and scope of the present disclosure. The description should therefore be regarded as illustrative instead of restrictive.

The invention claimed is:

1. A method comprising:
receiving, by a computing device from a mobile device:
an image of a sensor that comprises a quick response (QR) code; and
a request to add the sensor to an account associated with a premises;
identifying the sensor based on the QR code; and
based on identifying the sensor based on the QR code, adding the sensor to a list of sensors associated with the account.

2. The method of claim 1, wherein the image and the request are received from a software application executing on the mobile device.

3. The method of claim 1, further comprising:
receiving, by the computing device, information indicating a geographic location associated with the image, wherein the image, the information, and the request are received from a software application executing on the mobile device.

4. The method of claim 1, further comprising:
after adding the sensor to the list of sensors, receiving, by the computing device, data from the sensor.

5. The method of claim 1, further comprising:
after adding the sensor to the list of sensors, receiving, by the computing device, data from the sensor via one or more of a Bluetooth interface, a ZigBee interface, a Z-Wave interface, a universal serial bus (USB) interface, or a wireless interface.

6. The method of claim 1, wherein the QR code uniquely identifies the sensor.

7. The method of claim 1, wherein the QR code indicates a Media Access Control (MAC) address associated with the sensor.

8. The method of claim 1, wherein the QR code indicates additional information to establish communication with the sensor.

9. A method comprising:
sending, from a mobile device to a computing device:
an image of a sensor that comprises a quick response (QR) code; and
a request to add the sensor to an account associated with a premises, wherein the QR code identifies the sensor; and
receiving, from the computing device, confirmation that the sensor has been added to a list of sensors associated with the account.

10. The method of claim 9, wherein the image and the request are sent from a software application executing on the mobile device.

11. The method of claim 9, further comprising:
sending, by the mobile device, information indicating a geographic location associated with the image, wherein the image, the information, and the request are sent from a software application executing on the mobile device.

12. The method of claim 9, further comprising:
sending, from the mobile device to the computing device, a second image of an object in a vicinity of the sensor.

13. The method of claim 9, wherein the QR code uniquely identifies the sensor.

14. The method of claim 9, wherein the QR code indicates a Media Access Control (MAC) address associated with the sensor.

15. The method of claim 9, wherein the QR code indicates additional information to establish communication with the sensor.

16. A computing device comprising:
one or more processors; and
memory storing instructions that, when executed by the one or more processors, cause the computing device to:
receive, from a mobile device:
an image of a sensor that comprises a quick response (QR) code; and
a request to add the sensor to an account associated with a premises;
identify the sensor based on the QR code; and
based on identifying the sensor based on the QR code, add the sensor to a list of sensors associated with the account.

17. The computing device of claim 16, wherein the image and the request are received from a software application executing on the mobile device.

18. The computing device of claim 16, wherein the instructions, when executed by the one or more processors, further cause the computing device to:
receive information indicating a geographic location associated with the image, wherein the image, the information, and the request are received from a software application executing on the mobile device.

19. The computing device of claim 16, wherein the instructions, when executed by the one or more processors, further cause the computing device to:
after adding the sensor to the list of sensors, receive data from the sensor.

20. The computing device of claim 16, wherein the instructions, when executed by the one or more processors, further cause the computing device to:
after adding the sensor to the list of sensors, receive data from the sensor via one or more of a Bluetooth interface, a ZigBee interface, a Z-Wave interface, a universal serial bus (USB) interface, or a wireless interface.

21. The computing device of claim 16, wherein the QR code uniquely identifies the sensor.

22. The computing device of claim 16, wherein the QR code indicates a Media Access Control (MAC) address associated with the sensor.

23. The computing device of claim 16, wherein the QR code indicates additional information to establish communication with the sensor.

24. A mobile device comprising:
one or more processors; and
memory storing instructions that, when executed by the one or more processors, cause the mobile device to:
send, to a computing device:
an image of a sensor that comprises a quick response (QR) code; and
a request to add the sensor to an account associated with a premises, wherein the QR code identifies the sensor; and
receive, from the computing device, confirmation that the sensor has been added to a list of sensors associated with the account.

25. The mobile device of claim 24, wherein the image and the request are sent from a software application executing on the mobile device.

26. The mobile device of claim 24, wherein the instructions, when executed by the one or more processors, further cause the mobile device to:
send information indicating a geographic location associated with the image, wherein the image, the information, and the request are sent from a software application executing on the mobile device.

27. The mobile device of claim 24, wherein the instructions, when executed by the one or more processors, further cause the mobile device to:
send, to the computing device, a second image of an object in a vicinity of the sensor.

28. The mobile device of claim 24, wherein the QR code uniquely identifies the sensor.

29. The mobile device of claim 24, wherein the QR code indicates a Media Access Control (MAC) address associated with the sensor.

30. The mobile device of claim 24, wherein the QR code indicates additional information to establish communication with the sensor.

31. One or more non-transitory computer-readable media storing instructions that, when executed, cause:
receiving, by a computing device from a mobile device:
an image of a sensor that comprises a quick response (QR) code; and
a request to add the sensor to an account associated with a premises;
identifying the sensor based on the QR code; and
based on identifying the sensor based on the QR code, adding the sensor to a list of sensors associated with the account.

32. The one or more non-transitory computer-readable media of claim 31, wherein the image and the request are received from a software application executing on the mobile device.

33. The one or more non-transitory computer-readable media of claim 31, wherein the instructions, when executed, further cause:
receiving, by the computing device, information indicating a geographic location associated with the image,
wherein the image, the information, and the request are received from a software application executing on the mobile device.

34. The one or more non-transitory computer-readable media of claim 31, wherein the instructions, when executed, further cause:
after adding the sensor to the list of sensors, receiving, by the computing device, data from the sensor.

35. The one or more non-transitory computer-readable media of claim 31, wherein the instructions, when executed, further cause:
after adding the sensor to the list of sensors, receiving, by the computing device, data from the sensor via one or more of a Bluetooth interface, a ZigBee interface, a Z-Wave interface, a universal serial bus (USB) interface, or a wireless interface.

36. The one or more non-transitory computer-readable media of claim 31, wherein the QR code uniquely identifies the sensor.

37. The one or more non-transitory computer-readable media of claim 31, wherein the QR code indicates a Media Access Control (MAC) address associated with the sensor.

38. The one or more non-transitory computer-readable media of claim 31, wherein the QR code indicates additional information to establish communication with the sensor.

39. One or more non-transitory computer-readable media storing instructions that, when executed, cause:
sending, from a mobile device to a computing device:
an image of a sensor that comprises a quick response (QR) code; and
a request to add the sensor to an account associated with a premises, wherein the QR code identifies the sensor; and
receiving, from the computing device, confirmation that the sensor has been added to a list of sensors associated with the account.

40. The one or more non-transitory computer-readable media of claim 39, wherein the image and the request are sent from a software application executing on the mobile device.

41. The one or more non-transitory computer-readable media of claim 39, wherein the instructions, when executed, further cause:
sending, by the mobile device, information indicating a geographic location associated with the image,
wherein the image, the information, and the request are sent from a software application executing on the mobile device.

42. The one or more non-transitory computer-readable media of claim 39, wherein the instructions, when executed, further cause:
sending, from the mobile device to the computing device, a second image of an object in a vicinity of the sensor.

43. The one or more non-transitory computer-readable media of claim 39, wherein the QR code uniquely identifies the sensor.

44. The one or more non-transitory computer-readable media of claim 39, wherein the QR code indicates a Media Access Control (MAC) address associated with the sensor.

45. The one or more non-transitory computer-readable media of claim 39, wherein the QR code indicates additional information to establish communication with the sensor.

46. A system comprising:
a first computing device configured to send data,
wherein the data comprises:
an image of a sensor that comprises a quick response (QR) code; and
a request to add the sensor to an account associated with a premises; and
a second computing device configured to:
receive the data sent by the first computing device;
identify the sensor based on the QR code; and
based on identifying the sensor based on the QR code, add the sensor to a list of sensors associated with the account.

47. The system of claim 46, wherein the image and the request are received from a software application executing on the first computing device.

48. The system of claim 46, wherein the data further comprises information indicating a geographic location associated with the image, and
wherein the image, the information, and the request are received from a software application executing on the first computing device.

49. The system of claim 46, wherein the second computing device is further configured to, after adding the sensor to the list of sensors, receive sensor data from the sensor.

50. The system of claim 46, wherein the second computing device is further configured to, after adding the sensor to the list of sensors, receive sensor data from the sensor via one or more of a Bluetooth interface, a ZigBee interface, a Z-Wave interface, a universal serial bus (USB) interface, or a wireless interface.

51. The system of claim 46, wherein the QR code uniquely identifies the sensor.

52. The system of claim 46, wherein the QR code indicates a Media Access Control (MAC) address associated with the sensor.

53. The system of claim 46, wherein the QR code indicates additional information to establish communication with the sensor.

54. A system comprising:
a first computing device configured to send data comprising:
an image of a sensor that comprises a quick response (QR) code; and
a request to add the sensor to an account associated with a premises,
wherein the QR code identifies the sensor; and
a second computing device configured to receive the data sent by the first computing device, and to send a confirmation that the sensor has been added to a list of sensors associated with the account,
wherein the first computing device is further configured to receive the confirmation.

55. The system of claim 54, wherein the image and the request are sent from a software application executing on the first computing device.

56. The system of claim 54, wherein the data further comprises information indicating a geographic location associated with the image, and wherein the image, the information, and the request are sent from a software application executing on the first computing device.

57. The system of claim 54, wherein the first computing device is further configured to send a second image of an object in a vicinity of the sensor.

58. The system of claim 54, wherein the QR code uniquely identifies the sensor.

59. The system of claim 54, wherein the QR code indicates a Media Access Control (MAC) address associated with the sensor.

60. The system of claim 54, wherein the QR code indicates additional information to establish communication with the sensor.

* * * * *